(12) United States Patent
Kinugawa et al.

(10) Patent No.: US 9,437,098 B2
(45) Date of Patent: *Sep. 6, 2016

(54) OPERATION MACHINE

(71) Applicant: KUBOTA CORPORATION, Osaka-shi, Osaka (JP)

(72) Inventors: Ryosuke Kinugawa, Sakai (JP); Atsushi Matsumoto, Sakai (JP); Keisuke Miura, Sakai (JP)

(73) Assignee: KUBOTA CORPORATION, Osaka-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/603,119

(22) Filed: Jan. 22, 2015

(65) Prior Publication Data
US 2015/0137984 A1 May 21, 2015

(30) Foreign Application Priority Data

Feb. 16, 2011 (JP) .................................. 2011-030977
Feb. 16, 2011 (JP) .................................. 2011-030978
Mar. 22, 2011 (JP) .................................. 2011-062623

(51) Int. Cl.
G08B 21/00 (2006.01)
G08B 21/18 (2006.01)
(Continued)

(52) U.S. Cl.
CPC ............ *G08B 21/187* (2013.01); *A01D 41/12* (2013.01); *E02F 9/267* (2013.01); *G07C 5/085* (2013.01); *G07C 5/0808* (2013.01); *G07C 5/0816* (2013.01); *G08B 5/00* (2013.01)

(58) Field of Classification Search
CPC ..... G08B 21/187; G08B 23/00; G08B 17/30

USPC .................. 340/684, 506, 539.1, 679, 691.6
See application file for complete search history.

(56) References Cited

U.S. PATENT DOCUMENTS 6,058,290 A * 5/2000 Katagiri ....................... 340/7.52
6,059,290 A * 5/2000 Neil ........................... A63F 3/00
                                                            273/141 R
(Continued)

FOREIGN PATENT DOCUMENTS

CN      1837517 A     9/2006
JP      9-32039 A     2/1997
(Continued)

OTHER PUBLICATIONS

English Translation of JP09-032039.
(Continued)

*Primary Examiner* — Phung Nguyen
(74) *Attorney, Agent, or Firm* — Birch, Stewart, Kolasch & Birch, LLP

(57) ABSTRACT

To accurately grasp a generation situation of a warning generated in an operation machine, the operation machine is provided with: warning generation means 55 adapted to determine whether or not there is abnormality, and in the case where there is abnormality, generate a warning; warning storage means 56 adapted to store warning information on the warning; display means adapted to display the warning information stored in the warning storage means 56; and warning erasing means adapted to erase the warning information, wherein the warning storage means 56 is configured to store warning information on a warning generated after the erasure by the warning erasing means 57.

4 Claims, 24 Drawing Sheets

(51) Int. Cl.
*E02F 9/26* (2006.01)
*G08B 5/00* (2006.01)
*G07C 5/08* (2006.01)
*A01D 41/12* (2006.01)

(56) References Cited

U.S. PATENT DOCUMENTS

| | | | |
|---|---|---|---|
| 7,242,311 B2 * | 7/2007 | Hoff | E02F 9/20 340/425.5 |
| 2006/0092033 A1 | 5/2006 | Hoff et al. | |
| 2008/0059080 A1 * | 3/2008 | Greiner | H04L 41/0681 702/33 |
| 2009/0140872 A1 * | 6/2009 | O'Neal | G05B 9/03 340/679 |
| 2011/0137755 A1 * | 6/2011 | Sells | G06Q 30/0641 705/27.1 |

FOREIGN PATENT DOCUMENTS

| | | |
|---|---|---|
| JP | 11-217854 A | 8/1999 |
| JP | 2001-95345 A | 4/2001 |

OTHER PUBLICATIONS

English Translation of JP2001-95345.

* cited by examiner

Fig.4

[Warning code list]

| Warning code | Warning (abnormality) |
|---|---|
| 1 | CAN communication unavailable |
| . | . |
| . | . |
| . | . |
| 15 | Overheat |
| . | . |
| 17 | Fuel sensor disconnection |
| 18 | Water temperature sensor disconnection |
| . | . |
| . | . |
| . | . |

Fig.5

[Storage table]

| Warning code [15] | Warning information | |
|---|---|---|
| Initial hour meter part | 100h | Initial accumulated time |
| Initial time part | 2/3/2009 | Initial generation time |
| Post-erasure hour meter part | 140h | Intermediate accumulated time |
| Post-erasure time part | 6/7/2009 | Intermediate generation time |
| Final hour meter part | 140h | Latest accumulated time |
| Final time part | 6/7/2009 | Latest generation time |
| Count part | 1 | Intermediate generation count |
| Accumulated count part | 13 | Accumulated generation count |

Fig.6

(a)
[Storage table]

| Warning code [15] | Warning information | |
|---|---|---|
| Initial hour meter part | 100h | Initial accumulated time |
| Initial time part | 2/3/2009 | Initial generation time |
| Post-erasure hour meter part | 100h | Intermediate accumulated time |
| Post-erasure time part | 2/3/2009 | Intermediate generation time |
| Final hour meter part | 100h | Latest accumulated time |
| Final time part | 2/3/2009 | Latest generation time |
| Count part | 0 | Intermediate generation count |
| Accumulated count part | 12 | Accumulated generation count |

→

(b)
[Storage table]

| Warning code [15] | Warning information | |
|---|---|---|
| Initial hour meter part | 100h | Initial accumulated time |
| Initial time part | 2/3/2009 | Initial generation time |
| Post-erasure hour meter part | 140h | Intermediate accumulated time |
| Post-erasure time part | 6/7/2009 | Intermediate generation time |
| Final hour meter part | 140h | Latest accumulated time |
| Final time part | 6/7/2009 | Latest generation time |
| Count part | 1 | Intermediate generation count |
| Accumulated count part | 13 | Accumulated generation count |

Fig.8

[Storage table]

(a)

| Warning code [15] | Warning information | |
|---|---|---|
| Initial hour meter part | 100h | Initial accumulated time |
| Initial time part | 2/3/2009 | Initial generation time |
| Post-erasure hour meter part | 140h | Intermediate accumulated time |
| Post-erasure time part | 6/7/2009 | Intermediate generation time |
| Final hour meter part | 140h | Latest accumulated time |
| Final time part | 6/7/2009 | Latest generation time |
| Count part | 1 | Intermediate generation count |
| Accumulated count part | 13 | Accumulated generation count |

→

[Storage table]

(b)

| Warning code [15] | Warning information | |
|---|---|---|
| Initial hour meter part | 100h | Initial accumulated time |
| Initial time part | 2/3/2009 | Initial generation time |
| Post-erasure hour meter part | – | Intermediate accumulated time |
| Post-erasure time part | – | Intermediate generation time |
| Final hour meter part | – | Latest accumulated time |
| Final time part | – | Latest generation time |
| Count part |  | Intermediate generation count |
| Accumulated count part | 13 | Accumulated generation count |

Fig.9

[Storage table]

(a)

| Warning code [15] | Warning information | |
|---|---|---|
| Initial hour meter part | 100h | Initial accumulated time |
| Initial time part | 2/3/2009 | Initial generation time |
| Post-erasure hour meter part | 140h | Intermediate accumulated time |
| Post-erasure time part | 6/7/2009 | Intermediate generation time |
| Final hour meter part | 140h | Latest accumulated time |
| Final time part | 6/7/2009 | Latest generation time |
| Count part | 1 | Intermediate generation count |
| Accumulated count part | 13 | Accumulated generation count |

→

[Storage table]

(b)

| Warning code [15] | Warning information | |
|---|---|---|
| Initial hour meter part | 100h | Initial accumulated time |
| Initial time part | 2/3/2009 | Initial generation time |
| Post-erasure hour meter part | 140h | Intermediate accumulated time |
| Post-erasure time part | 6/7/2009 | Intermediate generation time |
| Final hour meter part | - | Latest accumulated time |
| Final time part | - | Latest generation time |
| Count part | | Intermediate generation count |
| Accumulated count part | 13 | Accumulated generation count |

Fig.12

[First storage table]

| Warning code [015] | Warning information | |
|---|---|---|
| Initial hour meter part | 100h | Initial accumulated time |
| Initial time part | 2/3/2009 | Initial generation time |
| Final hour meter part | 140h | Latest accumulated time |
| Final time part | 6/7/2009 | Latest generation time |

Fig.13

[First storage table]

| Warning code [015] | Warning information | |
|---|---|---|
| Initial hour meter part | 100h | Initial accumulated time |
| Initial time part | 2/3/2009 | Initial generation time |
| Final hour meter part | 100h | Latest accumulated time |
| Final time part | 2/3/2009 | Latest generation time |

(a)

→

[First storage table]

| Warning code [015] | Warning information | |
|---|---|---|
| Initial hour meter part | 100h | Initial accumulated time |
| Initial time part | 2/3/2009 | Initial generation time |
| Final hour meter part | 140h | Latest accumulated time |
| Final time part | 6/7/2009 | Latest generation time |

[Second storage table]

| Erasure time (day/month/year) |
|---|
| 2/4/2008 |
| ... |
| 6/1/2009 |
| 10/7/2009 |

(a)

[Second storage table]

| Erasure time (accumulated time) |
|---|
| 100h |
| ... |
| 2500h |
| 3000h |

[First storage table]

| Warning code [015] | Warning information | |
|---|---|---|
| Initial hour meter part | 100h | Initial accumulated time |
| Initial time part | 2/3/2009 | Initial generation time |
| Post-erasure hour meter part | 140h | Intermediate accumulated time |
| Post-erasure time part | 6/7/2009 | Intermediate generation time |
| Final hour meter part | 140h | Latest accumulated time |
| Final time part | 6/7/2009 | Latest generation time |
| Count part | 1 | Intermediate generation count |
| Accumulated count part | 13 | Accumulated generation count |

[Second storage table]

| Erasure time |
|---|
| 2/4/2008 |
| ... |
| 6/1/2009 |
| 10/7/2009 |

(b)

[First storage table]

| Warning code [015] | Warning information | |
|---|---|---|
| Post-erasure hour meter part | 160h | Intermediate accumulated time |
| Post-erasure time part | 13/7/2009 | Intermediate generation time |

[First storage table]

| Warning code [015] | Warning information | |
|---|---|---|
| Initial hour meter part | 100h | Initial accumulated time |
| Initial time part | 2/3/2009 | Initial generation time |
| Post-erasure hour meter part | 140h | Intermediate accumulated time |
| Post-erasure time part | 6/7/2009 | Intermediate generation time |
| Final hour meter part | 140h | Latest accumulated time |
| Final time part | 6/7/2009 | Latest generation time |
| Count part | 1 | Intermediate generation count |
| Accumulated count part | 13 | Accumulated generation count |

(b)

[First storage table]

| Warning code [015] | Warning information | |
|---|---|---|
| Initial hour meter part | 100h | Initial accumulated time |
| Initial time part | 2/3/2009 | Initial generation time |
| Post-erasure hour meter part | 140h | Intermediate accumulated time |
| Post-erasure time part | 6/7/2009 | Intermediate generation time |
| Final hour meter part | — | Latest accumulated time |
| Final time part | — | Latest generation time |
| Count part | — | Intermediate generation count |
| Accumulated count part | 13 | Accumulated generation count |

Fig.20

[Second storage table]

| Warning code | Erasure time | Warning (abnormality) |
|---|---|---|
| 001 | 2/4/2008 | CAN communication unavailable |
| ... | ... | ... |
| 015 | 10/7/2009 | Overheat |
| ... | ... | ... |
| 017 | | Fuel sensor disconnection |
| 018 | | Water temperature sensor disconnection |
| ... | ... | ... |

Fig.22

[Storage table]

(a)

| Warning code [15] | Warning information | | |
|---|---|---|---|
| | | | Pseudo erasing target | Pseudo erasure flag |
| Initial hour meter part | 100h | Initial accumulated time | — | — |
| Initial time part | 2/3/2009 | Initial generation time | — | — |
| Post-erasure hour meter part | 140h | Intermediate accumulated time | — | — |
| Post-erasure time part | 6/7/2009 | Intermediate generation time | — | — |
| Final hour meter part | 140h | Latest accumulated time | — | — |
| Final time part | 6/7/2009 | Latest generation time | — | — |
| Count part | 1 | Intermediate generation count | — | — |
| Accumulated count part | 13 | Accumulated generation count | — | — |

[Storage table]

(b)

| Warning code [15] | Warning information | | Pseudo erasing target | Pseudo erasure flag |
|---|---|---|---|---|
| Initial hour meter part | 100h | Initial accumulated time | × | × |
| Initial time part | 2/3/2009 | Initial generation time | × | × |
| Post-erasure hour meter part | 140h | Intermediate accumulated time | ○ | ○ |
| Post-erasure time part | 6/7/2009 | Intermediate generation time | ○ | ○ |
| Final hour meter part | 140h | Latest accumulated time | ○ | ○ |
| Final time part | 6/7/2009 | Latest generation time | ○ | ○ |
| Count part | 1 | Intermediate generation count | ○ | ○ |
| Accumulated count part | 13 | Accumulated generation count | × | × |

Fig.23

(a) [Display state before pseudo erasure]

| Warning code [15] | Warning information |
|---|---|
| Initial hour meter part | 100h |
| Initial time part | 2/3/2009 |
| Post-erasure hour meter part | 140h |
| Post-erasure time part | 6/7/2009 |
| Final hour meter part | 140h |
| Final time part | 6/7/2009 |
| Count part | 1 |
| Accumulated count part | 13 |

→

(b) [Display state after pseudo erasure]

| Warning code [15] | Warning information |
|---|---|
| Initial hour meter part | 100h |
| Initial time part | 2/3/2009 |
| Post-erasure hour meter part | — |
| Post-erasure time part | — |
| Final hour meter part | — |
| Final time part | — |
| Count part | — |
| Accumulated count part | 13 |

Fig.24

[Warning information list]

| Warning code [15] | Warning information | | Setting column |
|---|---|---|---|
| Initial hour meter part | 100h | Initial accumulated time | ☐ |
| Initial time part | 2/3/2009 | Initial generation time | ☑ |
| Post-erasure hour meter part | 100h | Intermediate accumulated time | ☐ |
| Post-erasure time part | 2/3/2009 | Intermediate generation time | ☑ |
| Final hour meter part | 100h | Latest accumulated time | ☐ |
| Final time part | 2/3/2009 | Latest generation time | ☐ |
| Count part | 0 | Intermediate generation count | ☐ |
| Accumulated count part | 12 | Accumulated generation count | ☑ |

A ↗ (pointing to Setting column)

OPERATION MACHINE

CROSS-REFERENCE TO RELATED APPLICATION

This application is a Continuation of co-pending U.S. application Ser. No. 13/822,018, now U.S. Pat. No. 8,976,037, filed Mar. 11, 2013 and for which priority is claimed under 35 U.S.C. 120. U.S. application Ser. No. 13/822,018 was filed as PCT/JP2012/053239 on Feb. 13, 2012 and claims priority to application No. 2011-030977, filed in Japan on Feb. 16, 2011, application No. 2011-030978, filed in Japan on Feb. 16, 2011, and application No. 2011-062623, filed in Japan on Mar. 22, 2011. The entirety of each of the above-identified applications is incorporated herein by reference.

TECHNICAL FIELD

The present invention relates to an operation machine such as a backhoe, tractor, or combine harvester.

BACKGROUND ART

An operation machine has been adapted such that, in the case where abnormality occurs in the operation machine, the abnormality is stored in a control device provided in the operation machine (e.g., Patent Literature 1).

A display device of an operation machine in Patent Literature 1 is adapted such that in the case where abnormality occurs in the operation machine during operation of the operation machine, abnormality information on the abnormality can be stored in a controller, and seen through the display device. As described, in the display device of the operation machine, abnormality information can be stored, whereas abnormality information stored in the display device can also be erased.

CITATION LIST

Patent Literature

[Patent Literature 1]
Japanese Unexamined Patent Publication JP-A2001-95345

SUMMARY OF INVENTION

Technical Problem

Meanwhile, in the case where even though during use of an operation machine, abnormality occurs to generate a warning, the operation machine is continuously used, a large load is placed on the operation machine. Even under such a situation, in the operation machine as disclosed in Patent Literature 1, abnormality information equivalent to the warning is automatically stored, and therefore by seeing the stored abnormality information, it turns out that the operation machine is used at the large load.

In the case where in order to conceal the fact that a user uses the operation machine at the large load, the user uses an erase function provided for the display device to erase the abnormality information (warning information), what load has been placed on the operation machine may not be able to be grasped.

The present invention is, in consideration of the above problem, intended to provide an operation machine that enables erasure of warning information to be grasped, and makes it easy to grasp a generation situation of a warning generated in the operation machine. Also, the present invention is, in consideration of the above problem, intended to provide an operation machine that enables the presence or absence of generation of warning information to be easily grasped, and also enables an erasure time of warning information to be easily identified.

Solution to Problem

Technical means of the present invention for solving the technical problem are characterized by the following points.

A first aspect of the present invention is provided with: warning generation means adapted to determine whether or not there is abnormality, and in a case where there is abnormality, generate a warning; warning storage means adapted to store warning information on the warning; display means adapted to display the warning information stored in the warning storage means; and warning erasing means adapted to erase the warning information, wherein the warning storage means is configured to store warning information on a warning generated after the erasure by the warning erasing means.

In a second aspect of the present invention, the display means is configured to include a display device that displays the warning information, wherein the display device is connected with an erasure performing switch that performs the erasure in order to erase the warning information by the warning erasing means; and the warning storage means stores the warning information on the warning generated after the erasure has been performed by the erasure performing switch.

A third aspect of the present invention is provided with: warning generation means adapted to determine whether or not there is abnormality, and in a case where there is abnormality, generate a warning; warning storage means adapted to store warning information on the warning; display means adapted to display the warning information stored in the warning storage means; and warning erasing means adapted to erase the warning information, and provided with erasure time storage means adapted to store an erasure time when the warning information is erased by the warning erasing means.

In a fourth aspect of the present invention, the display means is configured to include a display device that displays the warning information, wherein the display device is provided with an erasure performing switch that performs the erasure in order to erase the warning information by the warning erasing means; and the erasure time storage means stores, as the erasure time, a time when the erasure is performed by the erasure performing switch.

In a fifth aspect of the present invention, the warning storage means is configured to store the warning information on the warning generated after the erasure by the warning erasing means.

In a sixth aspect of the present invention, the warning storage means stores, among pieces of warnings generated after the erasure of the warning information, warning information on a first generated warning.

In a seventh aspect of the present invention, the warning storage means stores, among pieces of warnings generated after the erasure of the warning information, warning information on a last generated warning.

In an eighth aspect of the present invention, the warning information after the erasure is unerasable.

Advantageous Effects of Invention

According to the present invention, the following effects are produced.

According to the first aspect of the present invention, it is possible to grasp that warning information has been erased, and also it is possible to easily grasp a generation situation of a warning generated in the operation machine.

According to the second aspect of the present invention, it is possible to definitely know that warning information remaining in the warning storage means is generated after erasure has been performed by the erasure performing switch.

According to the third aspect of the present invention, it is possible to easily grasp the presence or absence of generation of warning information, and also to easily identify an erasure time of warning information.

According to the fourth aspect of the present invention, it is possible to identify a time when erasure was performed by the erasure performing switch.

According to the fifth aspect of the present invention, it is possible to accurately grasp warning information generated after erasure.

According to the sixth aspect of the present invention, it is possible to accurately grasp warning information that is first generated after erasure.

According to the seventh aspect of the present invention, it is possible to accurately grasp warning information that is last generated after erasure.

According to the eighth aspect of the present invention, warning information newly generated after erasure cannot be erased, and therefore it is possible to surely leave information after intentional erasure.

BRIEF DESCRIPTION OF DRAWINGS

FIG. 4 is a diagram illustrating a warning code list.

FIG. 5 is a diagram illustrating an example where pieces of warning information are stored in a storage table of warning storage means.

FIG. 6 is an explanatory diagram explaining overwriting of warning information.

FIG. 8 is a diagram illustrating an example where pieces of warning information are erased by warning erasing means.

FIG. 9 is a diagram illustrating a variation where pieces of warning information are erased by the warning erasing means.

FIG. 12 is a diagram illustrating an example where pieces of warning information are stored in a first storage table of warning storage means.

FIG. 13 is an explanatory diagram explaining overwriting of warning information in the first storage table.

FIG. 15 is a diagram illustrating an example where times are stored in a second storage table of erasure time storage means.

FIG. 16 is a diagram illustrating another example where pieces of warning information are stored in the first storage table of the warning storage means.

FIG. 17 is a diagram of a relationship between an erasure time stored in the erasure time storage means and an intermediate generation time stored in the warning storage means.

FIG. 18 is a diagram illustrating another example where pieces of warning information in the first storage table are erased by the warning erasing means.

FIG. 20 is a diagram illustrating an example where an erasure time is stored in the second storage table for each of the warning codes.

FIG. 22 is an explanatory diagram for the case of automatically setting pieces of warning information to be erased in a pseudo manner.

FIG. 23 is a diagram illustrating display examples of pieces of warning information before and after pseudo erasure.

FIG. 24 is an explanatory diagram for the case of manually setting pieces of warning information to be erased in the pseudo manner.

DESCRIPTION OF EMBODIMENTS

Figure 10:
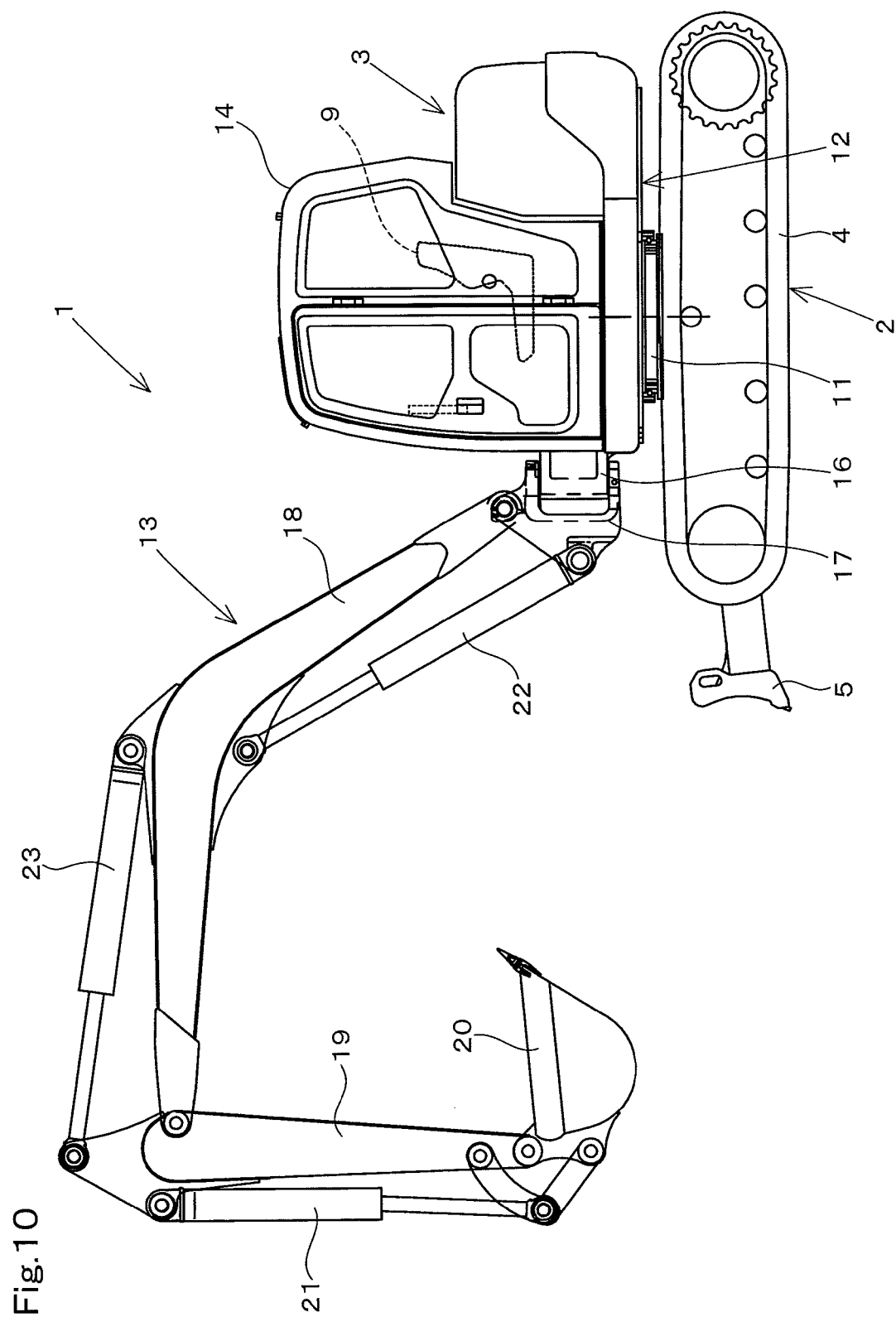
FIG. 10 illustrates an overall side view of the operation machine.

Embodiments of the present invention will hereinafter be described on the basis of the drawings. FIG. 10 illustrates an overall view of an operation machine of the present invention. As illustrated in FIG. 10, in the present invention, as the operation machine, a backhoe is regarded; however, the operation machine may be a tractor, a combine harvester, or another machine that operates.

First, an overall configuration of the operation machine is described.

As illustrated in FIG. 10, the operation machine 1 is provided with a traveling unit 2 as a lower part and a revolving body 3 as an upper part.

As the traveling unit 2, a crawler type traveling unit that is adapted to be provided with a left and right pair of traveling bodies 4 respectively having crawlers made of rubber, and operate the both traveling bodies 4 with a traveling motor M is employed. Also, a front part of the traveling unit 2 is provided with a dozer 5.

The revolving body 3 has: a revolving base 12 that is supported on the traveling unit 2 through a revolving bearing 11 so as to be revolvable left and right around a vertical revolving pivot; and an operating unit 13 (excavating unit) that is provided at a front part of the revolving base 12. On the revolving base 12, an engine, a radiator, driver's seat 9, a fuel tank, an operating oil tank, a control valve that controls operating oil from the operating oil tank, and the like are provided. Around the driver's seat 9, a display device 15 that displays various pieces of information on the operation machine 1 is provided. The driver's seat 9 is surrounded by a cabin 14 provided on the revolving base 12.

The operating unit 13 is provided with: a swing bracket 17 that is supported by a support bracket 16 provided at the front part of the revolving base 12 with being offset slightly to the right of a horizontally central part so as to be swingable left and right around a vertical shaft center; a boom 18 that is vertically swingably supported by the swing bracket 17 with a base part side thereof being pivotally attached to the swing bracket 17 so as to be rotationally movable around a horizontal shaft center; an arm 19 that is supported by a fore end side of the boom 18 so as to be swingable back and forth with being pivotally attached to the fore end side so as to be rotationally movable around a horizontal shaft center; and a bucket 20 that is provided on a fore end side of the arm 19 so as to be operable in a scooping/dumping manner.

The swing bracket 17 is swung by expansion and contraction of a swing cylinder that is provided inside the revolving base 12; the boom 18 is swung by expansion and contraction of a boom cylinder 22 that is set between the boom 18 and the swing bracket 17; the arm 19 is swung by expansion and contraction of an arm cylinder 23 that is set between the arm 19 and the boom 18; and the bucket 20 is subjected to the scooping/dumping operation by expansion and contraction of a bucket cylinder 21 that is set between the bucket 20 and the arm 19.

Figure 1:
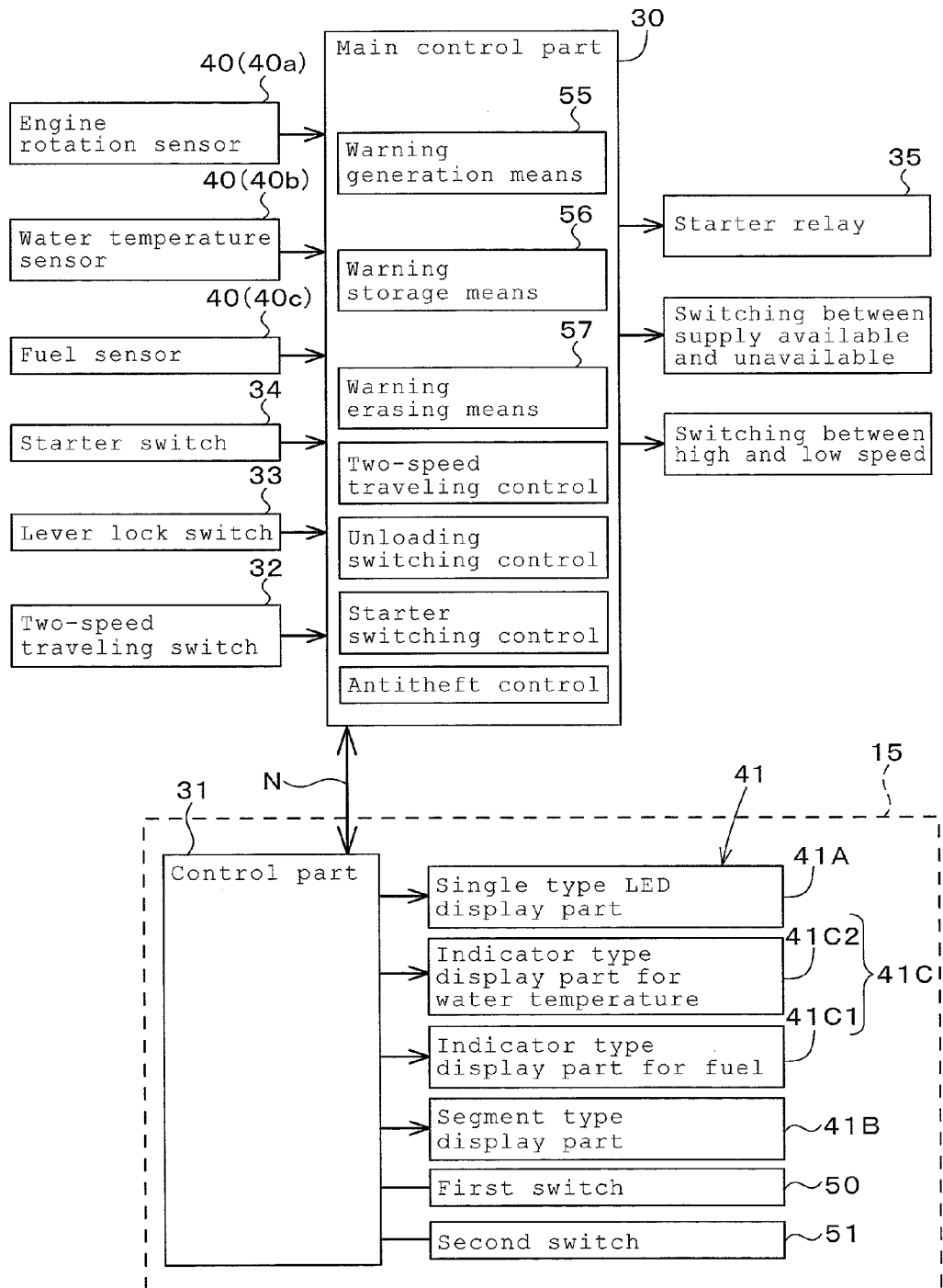
FIG. 1 is a block diagram of a control system in an operation machine.

Each of the cylinders (swing cylinder, boom cylinder 22, arm cylinder 23, and bucket cylinder 21) is adapted to operate with the operating oil of which a flow rate is controlled by the control valve. FIG. 1 illustrates a block diagram of a control system in the operation machine.

As illustrated in FIG. 1, the control system in the operation machine is provided with: a main control device 30 that mainly controls the operation machine; and the display device 15 that is arranged separately from the main control device 30. The main control device 30 and the display device 15 are adapted to be able to transceive data through a vehicle communication network N such as a Controller Area Network (CAN communication). Note that the vehicle communication network may be any network if the network enables the main control device 30 and a sub control part 31 to mutually transceive data, and may be FlexRay or another network.

The main control device 30 is configured to include a CPU and the like, and can control various units (traveling unit, operating unit, and the like) provided for the operation machine 1. For example, the main control device 30 can perform two-speed traveling control, unloading switching control, starter switching control, antitheft control, and other control.

The two-speed traveling control is control that, on the basis of an on or off input signal from a two-speed traveling switch 32 that switches speed of the traveling unit 2 between high speed and low speed, switches the speed of the traveling unit 2 between the high speed and the low speed. The unloading switching control is control that, on the basis of an on or off input signal from a lever lock switch 33 provided laterally to the driver's seat 9, switches between being able and unable to supply the operating oil ejected from a pump to the control valve. The starter switching control is control that, on the basis of an on or off input signal from a starter switch 34, switches a starter relay 35. The antitheft control is control that, in the case where matching between an ID code incorporated in an engine key that starts the engine and an ID code incorporated in the main control device 30 holds, permits the starter relay 35 to be turned on from off, and in the case where the matching does not hold, does not permit the starter relay 35 to be turned on from off. Antitheft means is provided with a registration function for registering an ID code of a new engine key in the main control device 30. Note that the main control device 30 is only required to be a device that can, without limitation to the exemplified types of control, control the various units.

The main control device 30 is connected with a plurality of detectors 40 that detect various states of the operation machine with sensors and the like, respectively.

Specifically, the main control device 30 is connected with: an engine rotation sensor (engine rotation detector) 40a that detects an engine rotation number; a water temperature sensor (water temperature detector) 40b that detects water temperature; and a fuel sensor (fuel detector) 40c that detects fuel (remaining amount). That is, the main control device 30 is adapted to be inputted with the states respectively detected by the detectors 40 such as the engine rotation sensor 40a, water temperature sensor 40b, and fuel sensor 40c. In addition, the main control device 30 is also adapted to be inputted with the ID code of the engine key that starts the engine, voltage of a battery, and the like.

When such a main control device 30 is inputted with various pieces of detected information, such as the engine rotation number, fuel, and water temperature, the main control device 30 transmits the respective pieces of detected information (measured values) to the display device 15 through the vehicle communication network N. Also, on the basis of the pieces of detected information (engine rotation number, fuel, water temperature, and the like) obtained from the detectors 40, the main control device 30 is adapted to determine whether or not abnormality occurs in the operation machine 1, and in the case where the main control device 30 determines that the operation machine 1 is abnormal, the main control device 30 is adapted to generate a warning to store (save) information on the warning (referred to as warning information) and transmit the warning information to the display device 15 so as to be able to display the warning information on the display device 15.

In the following, the display device 15 and the main control device 30 are described in detail.

Figure 2:
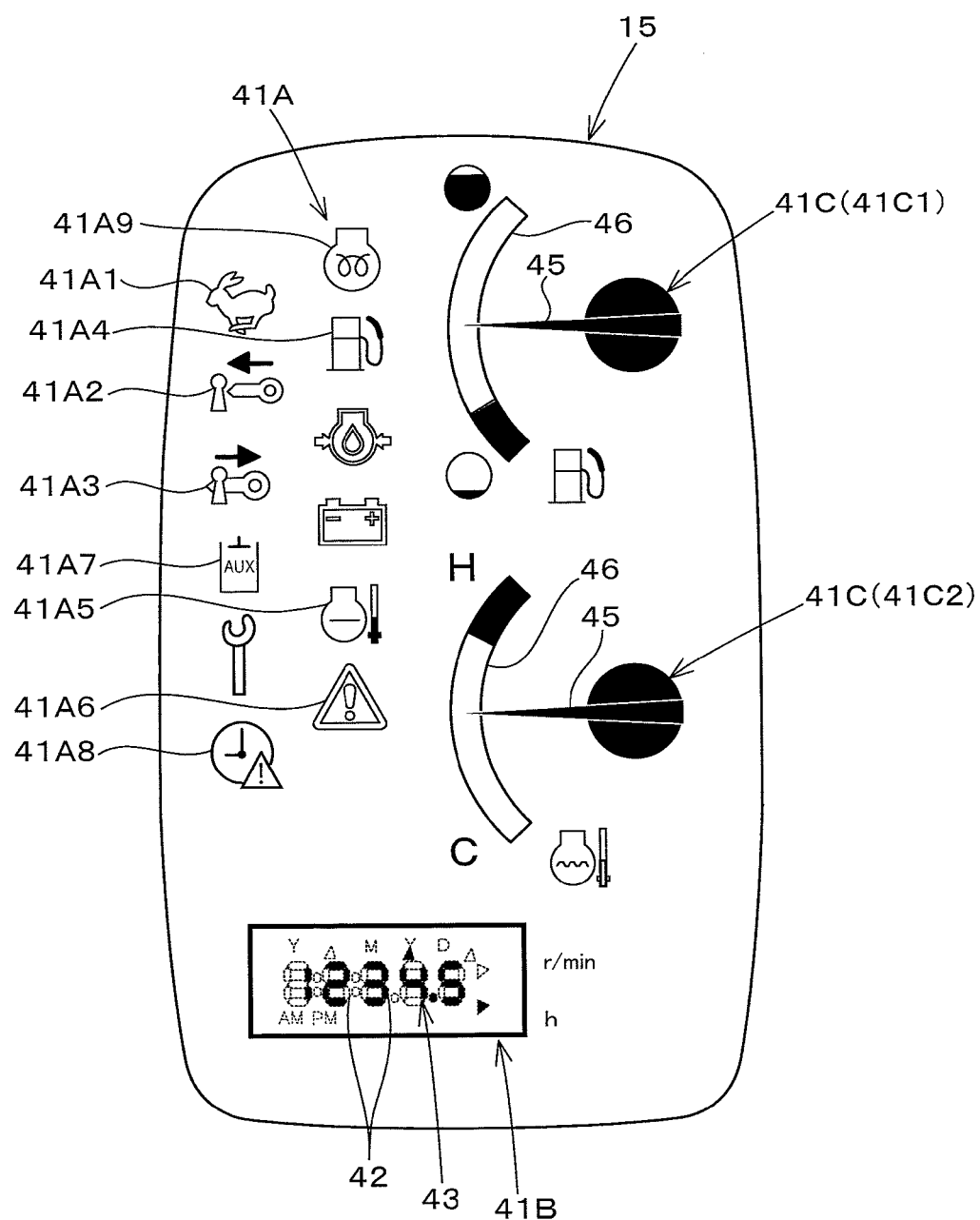
FIG. 2 illustrates an overall front view of a display device.

As illustrated in FIG. 2, the display device 15 is provided with: display parts 41 that can display various pieces of information; and the control part 31 that controls the display parts 41.

Specifically, in a front view of the display device 15, on a left side of the display device 15, twelve single type LED display parts 41A are provided; on a lower side, a segment type display part 41B is provided; and on a right side, two vertically arranged indicator type display parts 41C are provided.

Each of the single type LED display parts 41A (sometimes referred to as the LED display parts 41A) is one that displays detected information itself or warning information with use of lighting, extinction, or blinking of an LED element.

Specifically, the LED display parts 41A provided on the display device 15 include an LED display part for traveling 41A1, LED display part for registration 41A2, LED display part for oblivion of pulling out 413A, LED display part for fuel 41A4, LED display part for water temperature 41A5, LED display part for warning 41A6, and the like.

The LED display part for traveling 41A1 lights when the operation machine 1 comes into a high speed traveling state. In the case where the ID code is registered with use of the registration function, the LED display part for registration 41A2 lights when the engine key is inserted into a cylinder (lights in order to inform insertion timing). In a situation where the engine key inserted into the cylinder at the time of the registration of the ID code is kept inserted for a long time, the LED display part for oblivion of pulling out 41A3 lights to inform oblivion of pulling out the engine key. The LED display part for fuel 41A4 blinks in the case where the fuel is brought into a state of being short. The LED display part for water temperature 41A5 blinks in the case where the water temperature is brought into an abnormal state or the water temperature sensor 40b is brought into an abnormal state to generate a warning. The LED display part for warning 41A6 blinks in the case where some sort of abnormality occurs in the operation machine 1 to generate a warning. In addition, the LED display parts 41A of the display device 15 include an LED display part for AUX 41A7, LED display part for setting a clock right 41A8, LED display part for blower 41A9, and the like; however, description of them is omitted.

The segment type display part 41B is one that displays various pieces of information by lighting or extinguishing a plurality of segments 42. The segment type display part 41B is configured to include 48 segments (segment elements).

Specifically, the segment type display part 41B is configured such that five segment groups 43 (referred to as seven-segments) each including seven segments 42 are horizontally arranged; around the seven-segments 43, nine segments respectively configured to have character shapes (Y, M, D, AM, and PM) and symbol shapes (A) are arranged; and between the seven-segments 43, four segments respectively configured to have dot shapes (:, .) are arranged. The seven-segments 43 are ones that are intended to display numbers, characters, symbols, and the like, and the segments for characters and symbols arranged around the seven-segments 43 are ones that instruct to operate a screen and provide a supplement so as to be able to grasp what kind of screen.

Figure 3:
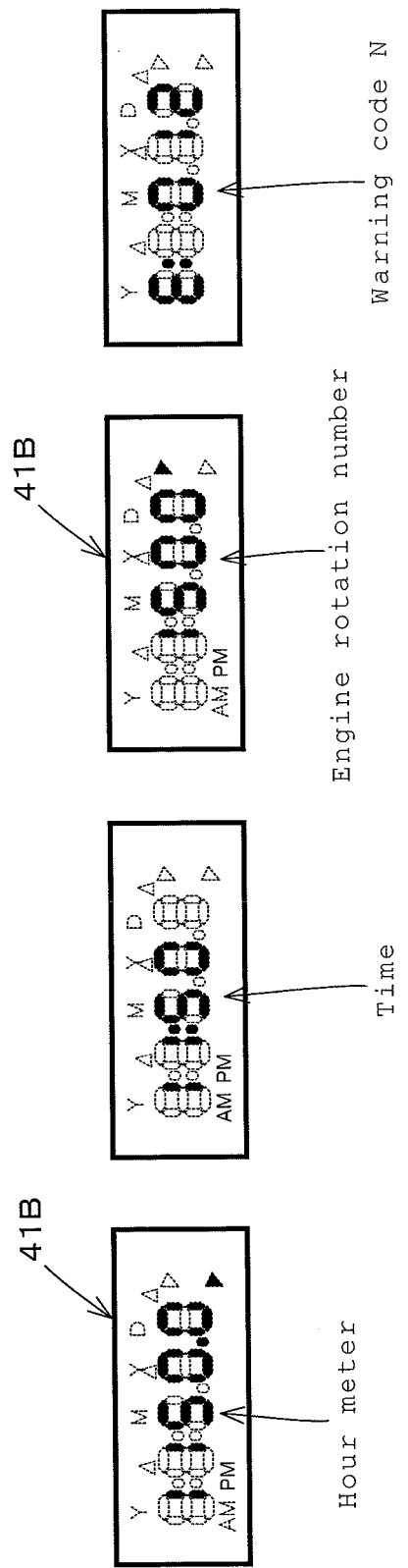
FIG. 3 is a diagram illustrating an example of information displayed when the display device is put into a normal display mode.

FIG. 3 is a diagram illustrating an example of information displayed in the segment type display part 41B.

As illustrated in FIG. 3, after the cylinder has been turned with the engine key to supply power to the display device 15, by pressing a first switch 50 connected to the display device 15, the segment type display part 41B displays an hour meter (accumulated time).

Note that the hour meter refers to an accumulated time during which the operation machine 1 was driven after shipment of the operation machine 1 by a manufacturer manufacturing the operation machine 1, and is adapted to be stored in the main control device 30 or the display device 15.

Then, by, in a state where the segment type display part 41B displays the accumulated time (hour meter), pressing a second switch 51 that is connected to the display device 15 separately from the first switch 50, the information displayed by the segment type display part 41B is switched to display a current time in the segment type display part 41B.

By, in a state where the segment type display part 41B displays the time, pressing the second switch 51, the segment type display part 41B displays the engine rotation number. Further, by, in a state where the segment type display part 41B displays the engine rotation number, pressing the second switch 51, the segment type display part 41B displays a warning code N corresponding to a warning generated in the operation machine 1. In addition, in the case where a plurality of warnings are generated in the operation machine 1, warning codes N are sequentially displayed. In the case where a warning is not generated, no warning code N is displayed. Note that "E:" displayed on a left side of the segment type display part 41B indicates that a numerical value on a right side is a warning code.

That is, when the cylinder is turned with the engine key, the display device 15 is put into a normal mode, and in the segment type display part 41B, the hour meter, time, engine rotation number, and warning can be sequentially displayed.

As illustrated in FIG. 2, each of the indicator type display parts 41C is provided with: a pointer part 45 that rotationally moves around a rotation center part at a predetermined angle; and a gauge display part 46 that overlaps with the pointer part 45, and displays various pieces of information on the basis of the rotational movement of the pointer part 45 and a position of a tip of the pointer part 45 with respect to the gauge display part 46.

For example, on an upper side in the front view of the display device 15, an indicator type display part for fuel 41C1 is provided, and on a lower side of the indicator type display part for fuel 41C1, an indicator type display part for water temperature 41C2 is provided. The indicator type display part for fuel 41C1 indicates that the fuel is full when the tip of the pointer part 45 points an upper end of the gauge display part 46, whereas when the tip points a lower end of the gauge display part 46, the indicator type display part for fuel 41C1 indicates that the fuel is short (finished).

The indicator type display part for water temperature 41C2 indicates that the water temperature is high when the tip of the pointer part 45 points an upper end of the gauge display part 46, whereas when the tip points a lower end of the gauge display part 46, the indicator type display part for water temperature 41C2 indicates that the water temperature is low.

The control part 31 of the display device 15 is one that performs control to transceive data (information) between the main control device 30 and the display device 15, or to display various pieces of inputted information (detected information, warning information) on the display parts 41, and configured to include a CPU, a general-purpose IC, and the like. Further, the "normal display mode" or a "special display mode" in the display device 15 may be performed by a control program installed in the control part 31 of the display device 15 or by a control program installed in the main control device 30.

Next, the main control device 30 is described in detail.

The main control device 30 is provided with warning generation means 55, warning storage mean 56, and warning erasing means 57. The warning generation means 55 and the warning erasing means 57 are configured to include programs and the likes stored in the main control device 30, respectively.

The warning generation means 55 determines on the basis of the pieces of detected information detected by the detectors 40 whether or not the operation machine 1 is abnormal, and in the case where the warning generation means 55 determines that the operation machine 1 is abnormal, the warning generation means 55 generates a warning.

For example, in the case where the detected engine rotation number is equal to or more than a predetermined rotation number (e.g., 700 rpm), the detected water temperature is equal to or more than a predetermined temperature (e.g., 120° C. or more), and the detected rotation number and the detected water temperature continue for a predetermined time or more (e.g., 1 second or more), the warning generation means 55 determines that the operation machine 1 is abnormal (overheat), and generates a warning indicating the overheat.

Also, in the case where abnormality such as CAN communication abnormality, fuel sensor disconnection abnormality, or water temperature sensor disconnection abnormality occurs, the warning generation means 55 generates a warning.

The CAN communication abnormality is abnormality by which even though the main control device 30 normally operates, for example, the CAN communication with the display device 15 is prevented from being normally performed.

The fuel sensor disconnection abnormality is abnormality in which a resistance value detected by the fuel sensor 40c is equal to or more than a predetermine value and very large, and therefore it is considered that between the fuel sensor 40c and the main control device 30, disconnection occurs. The water temperature sensor disconnection abnormality is abnormality in which a resistance value detected by the water temperature sensor 40b is equal to or more than a predetermined value and very large, and therefore it is considered that between the water temperature sensor 40b and the main control device 30, disconnection occurs.

The warning generation means 55 is adapted to output a warning code N (warning type) as illustrated in FIG. 4 so as to be able to distinguish each warning (abnormality) when generating the warning.

For example, a warning code N related to the CAN communication abnormality is set to "01"; a warning code N related to the overheat is set to "15"; a warning code N related to the fuel sensor disconnection abnormality is set to "17"; and a warning code N related to the water temperature sensor disconnection abnormality is set to "18"

In the case where the CAN communication abnormality occurs, the warning generation means 55 outputs the warning code "01" corresponding to the CAN communication abnormality, and in the case where the overheat occurs, the warning generation means 55 outputs the warning code "15" corresponding to the overheat.

That is, the warning generation means 55 uses the various pieces of information inputted to the main control device 30 to determine whether or not the operation machine 1 is abnormal, and in the case where the warning generation means 55 determines that the operation machine 1 is abnormal, the warning generation means 55 generates a warning code N corresponding to a warning related to the abnormality. Note that it should be appreciated that a warning generated by the warning generation means 55 is not limited to any of the above-described examples, but may be any warning.

The warning storage means 56 is configured to include, for example, a nonvolatile memory (e.g., a flash memory) and the like, and one that stores information on a warning (warning information). The warning storage means 56 is adapted to store at least a warning code N (warning type) corresponding to a warning and a time when the warning is generated with relating the warning code N and the time to each other. In the following, a warning code N is described as a code for distinguishing warning information.

As illustrated in FIG. 5, the warning storage means 56 has a storage table for storing content of warning information distinctively for each of the warning codes N. That is, the storage table is assigned to each of the warnings.

Further, each of the storage tables is divided into an initial hour meter part, an initial time part, a post-erasure hour meter part, a post-erasure time part, a final hour meter part, a final time part, a count part, and an accumulated count part.

The initial hour meter part is a part that, in the case where a warning corresponding to a warning code N is generated first after the shipment of the operation machine 1 from the manufacturer manufacturing the operation machine 1, stores an accumulated time (hour meter) at the time of the warning generation as warning information. The initial time part is a part that, in the case where the warning corresponding to the warning code N is generated first after the shipment of the operation machine 1 from the manufacturer, stores a time of the warning generation (generation time) as warning information.

For example, it is assumed that the overheat occurs first after the shipment of the operation machine 1; the accumulated time (hour meter) at the time of the warning generation is 100 hours (100 h); and the generation time is Mar. 2, 2009.

In this case, the warning storage means 56 stores "100 hours", which is the accumulated time at the time of the first generation of the overheat warning, in the initial hour meter part corresponding to the overheat, and also stores "Mar. 2, 2009", which is the occurrence time of the overheat, in the initial time part corresponding to the overheat. For convenience of description, warning information stored in a corresponding initial hour meter part, and warning information stored in a corresponding initial time part may be respectively referred to as an initial accumulated time and an initial generation time.

The post-erasure hour meter part is a part that, in the case where, as will be described later, after pieces of warning information have been erased from the warning storage means 56 by the warning erasing means 57 (after an after-mentioned erasure performing switch has been pressed), a warning is newly generated, stores an accumulated time (hour meter) at the time of the new warning generation as warning information.

The post-erasure time part is a part that, in the case where the pieces of warning information have been erased by the warning erasing means 57 (after the after-mentioned erasure performing switch has been pressed), the warning is newly generated, stores a time of the warning generation as warning information.

For example, it is assumed that after pieces of warning information have been erased, the overheat newly occurs; and an accumulated time at the time of the overheat occurrence is 140 hours (140 h); and an occurrence time is Jul. 6, 2009.

In this case, the warning storage means 56 stores "140 hours", which is the accumulated time, in the post-erasure hour meter part corresponding to the overheat, and also stores "Jul. 6, 2009", which is the occurrence time of the overheat, in the post-erasure time part corresponding to the overheat.

In addition, in the case where after the pieces of warning information have been once erased, the warning is generated several times without performing an erasing operation, the warning storage means 56 writes an accumulated time to be stored over the post-erasure hour meter part, and also writes a time to be stored over the post-erasure time part. For convenience of description, warning information stored in a corresponding post-erasure hour meter part, and warning information stored in a corresponding post-erasure time part may be respectively referred to as an intermediate accumulated time and an intermediate generation time.

The final hour meter part is a part that, in the case where a latest warning is generated, stores an accumulated time (hour meter) at the time of the warning generation as warning information. The final time part is a part that, in the case where the latest warning is generated, stores a time of the generation as warning information.

For example, it is assumed that, as illustrated in FIG. 6(a), in the case wherein the final hour meter part, "100 hours" as an accumulated time is already stored, and in the final time part, "Mar. 2, 2009" as a time is already stored, subsequently, in Jul. 6, 2009, a warning corresponding to the same warning code N is generated, and an accumulated time at the warning generation is 140 hours.

In this case, the warning storage means 56 writes "140 hours" as the accumulated time over the final hour meter part to store "140 hours", and also writes "Jul. 6, 2009" as the generation time over the final time part to store "Jul. 6, 2009". On the basis of this, the pieces of warning information stored in the warning storage means 56 come into a state in FIG. 6(*b*) from the state in FIG. 6(*a*).

In addition, for convenience of description, warning information stored in a corresponding final time meter part, and warning information stored in a corresponding final time part may be respectively referred to as a latest accumulated time and a latest generation time.

The count part is a part that stores the number of times the warning is generated (generation count) as warning information. For example, every time the overheat warning is repetitively generated, a warning generation count is counted up, and every time the count up is performed, the warning storage means 56 writes the generation count over the count part. In addition, the count part is adapted such that information therein is erased by the warning erasing means 57 as will be described later, and in the case where the warning erasing means 57 erases a generation count in the count part, the generation count becomes zero.

The accumulated count part is a part that, after the shipment of the operation machine 1 from the manufacturer, stores an accumulated warning generation count for the same warning, and the accumulated warning generation count cannot be erased by the warning erasing means 57 (a generation count in the accumulated count part cannot be made zero.) Every time the warning is generated, the warning storage means 56 stores a generation count in the accumulated count part by overwriting. In addition, for convenience of description, warning information stored in a corresponding count part, and warning information stored in a corresponding accumulated count part may be respectively referred to as an intermediate generation count and an accumulated generation count.

As described above, the warning storage means 56 is adapted to, in a storage table set for each of the warning types, store eight types of corresponding warning information (initial accumulated time, initial generation time, intermediate accumulated time, intermediate generation time, latest accumulated time, latest generation time, intermediate generation count, and accumulated generation count).

Meanwhile, various pieces of warning information stored by the warning storage means 56 can be displayed by putting the display device 15 not into the above-described normal display mode but into the special display mode. That is, the display device 15 can be operated as display means adapted to display pieces of warning information stored in the warning storage means 56.

Figure 7:
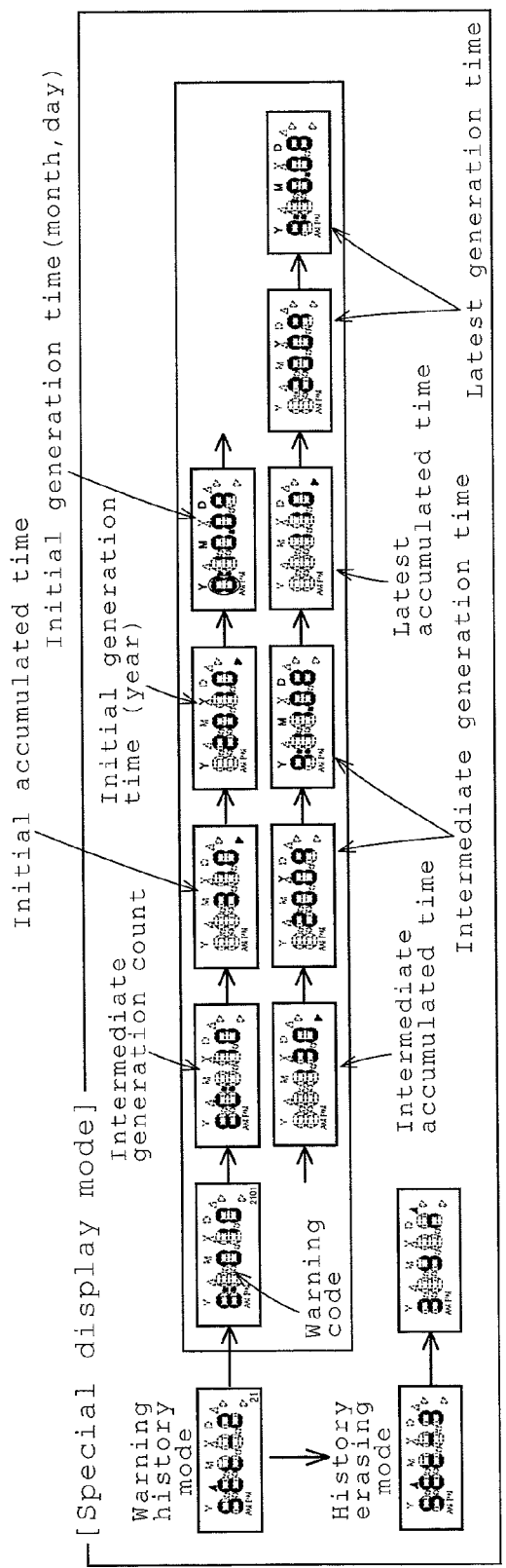
FIG. 7 is a diagram illustrating an example of information displayed when the display device is put into a special display mode.

As illustrated in FIG. 7, for example, by not performing an operation of turning the cylinder with the engine key, which is normally performed in the operation machine, but performing a special operation (e.g., turning the cylinder with the engine key while pressing the first switch 50), a mode of the display device 15 is switched from the normal display mode to the special display mode.

After the display device 15 has been put into the special display mode, by pressing the second switch 51 long for several seconds, the display device 15 is put into a "warning history mode" in the "special display mode". After the display device 15 has been put into the warning history mode, by pressing the second switch 51 long, a warning code N corresponding to pieces of warning information is displayed in the segment type display part 41B (warning code display screen).

The warning code display screen is a screen for selecting which warning to display from among the plurality of warnings, and by pressing the second switch 51 long for several seconds on the warning code display screen, the warning code N can be changed. That is, on the warning code display screen, which storage table, which is set for one of the warning types, can be set to read pieces of warning information therein from the warning storage means 56.

Then, by pressing the second switch 51 in a state where the warning code display screen is displayed, from a storage table corresponding to the warning code N, an intermediate generation count (warning information stored in the count part) is read onto the display device 15, and on the segment type display part 41B, the intermediate generation count (warning information stored in the count part) is displayed.

Subsequently, by pressing the second switch 51, an initial accumulated time (warning information stored in the initial hour meter part) is read from the storage table corresponding to the warning code N onto the display device 15, and on the segment type display part 41B, the initial accumulated time is displayed.

Further, by pressing the second switch 51, an initial generation time (warning information stored in the initial time part) is read from the storage table corresponding to the warning code N, and on the segment type display part 41B, part (year) of the initial generation time is displayed, and then, by pressing the second switch 51, part of the initial generation time (month and day) is displayed. In this manner, every time the second switch 51 is pressed, the pieces of warning information are sequentially read from the storage table and displayed on the segment type display part 41B.

Also, even after the initial generation time has been read from the storage table, every time the second switch 51 is pressed, an intermediate accumulated time, an intermediated generation time, a latest accumulated time, and a latest generation time are read and displayed on the segment type display part 41B.

Note that the present embodiment is adapted to, every time the second switch 51 is pressed, read the respective pieces of warning information from the storage table; however, the present invention may be adapted to, when a warning code N is displayed on the warning code display screen, collectively read and temporarily store pieces of warning information in a storage table corresponding to the warning code N, and then every time the second switch 51 is pressed, sequentially display the pieces of warning information on the segment type display part 41B.

As described above, the present embodiment is adapted such that, for each of the warning codes N, many pieces of warning information are stored in the warning storage means 56, and pieces of warning information can be erased by the warning erasing means 57.

The warning erasing means 57 is means adapted to logically erase pieces of warning information stored in the warning storage means 56, and as will be described later, the pieces of logically erased warning information are processed as not being present in the warning storage means 56.

As illustrated in FIG. 7, to activate the warning erasing means 57, by pressing the second switch 51 long for several seconds, the display device 15 is put into a "history erasing mode" in the "special display mode". After the display device 15 has been put into the history erasing mode, by pressing the second switch 51 long for several seconds, the warning erasing means 57 is activated. At this time, the second switch 51 serves as the erasure performing switch for performing erasure.

When the second switch 51 is pressed to activate the warning erasing means 57, among pieces of warning information stored in the warning storage means 56, excluding initial accumulated times, initial generation times, and accumulated generation counts, intermediate accumulated times, intermediate generation times, latest accumulated times, latest generation times, and intermediate generation counts are logically erased. That is, when the warning erasing means 57 is activated, the intermediate accumulated times, intermediate generation times, latest accumulated times, latest generation times, and intermediate generation counts that are present in all of the storage tables of the warning storage means 56 are erased.

For example, it is assumed that, as illustrated in FIG. 8(a), "100 h" as an initial accumulated time, "2/3/2009" as an initial generation time, "140 h" as an intermediate accumulated time, "6/7/2009" as an intermediate generation time, "140 h" as a latest accumulated time, "6/7/2009" as a latest generation time, "1" as an intermediate generation count, and "13" as an accumulated generation count are stored in the warning storage means 56.

In this case, when the warning erasing means 57 is operated, as illustrated in FIG. 8(b), in the warning storage means 56, "100 h" as the initial accumulated time, "2/3/2009" as the initial generation time, and "13" as the accumulated generation count remain, and the other pieces of information are erased, and cannot be displayed even on the display device 15.

That is, in the case of erasing pieces of warning information by the warning erasing means 57, the pieces of erased warning information are handled as being absent in the warning storage means 56, cannot be read from the warning storage means 56, and cannot be displayed by the display device 15.

As described above, according to the operation machine of the present invention, the warning storage means 56 is configured to store pieces of warning information that are generated after erasure by the warning erasing means 57. That is, the warning storage means 56 is provided with: the post-erasure hour meter parts each of which, in the case where a warning is newly generated after pieces of information have been erased by the warning erasing means 57, stores an accumulated time (hour meter) at the time of the warning generation; and also the post-erasure time parts, a corresponding one of which stores a time of the warning generation.

On the basis of this, pieces of warning information that are newly generated after erasure can be left with being distinguished from other pieces of warning information, and can be checked with use of the display device 15 or the like. A situation according to a conventional technique is that after generation of a warning, warning information is simply left, and therefore even a warning generated after erasure or even a warning generated without performing erasure is left as warning information without distinction. For this reason, even in the case where a warning history remains in the warning storage means 56 such as a memory, it is difficult to determine whether or not when (after erasure) a warning is generated.

For this reason, it is easy for a user to erase warning information to thereby intentionally conceal the fact that a warning is generated during use of the operation machine 1, and at the time of maintain the operation machine 1, a warning generation situation in the operation machine 1 cannot be grasped.

On the other hand, in the present invention, by seeing warning information (intermediate accumulated time) stored in a post-erasure hour meter part, and warning information (intermediate generation time) stored in a corresponding post-erasure time part, at least the fact that erasing work has been performed can be grasped, and also from pieces of warning information generated after the erasure, warnings generated in the past can be estimated. A warning having been once generated tends to be easily generated again, and therefore by seeing a warning code N corresponding to an post-erasure hour meter part, or a post-erasure time part, what a warning before erasure is can also be estimated.

For example, even in the case where, under a situation where the overheat warning is frequently generated during use of the operation machine 1, and in the warning storage means 56, a history of pieces of warning information on the overheat is stored, a user or the like intentionally erases the warnings to attempt to lie as if the overheat has not occurred, the overheat is easily newly generated after the erasure, and in the post-erasure hour meter part and the post-erasure time part, pieces of information on the overheat generated after the erasure remain. On the basis of this, a past warning generation situation of the operation machine 1 can be accurately grasped.

In particular, the warning storage means 56 is adapted to store pieces of warning information that are generated after erasure has been performed by the erasure performing switch (second switch 51), and therefore in the warning storage means 56, the pieces of warning information that are generated after the erasure performing switch has been pressed definitely remain. For this reason, it is possible to definitely grasp that the pieces of warning information remaining in the warning storage means 56 are ones that are generated after the erasure has been performed.

Also, it can be possible to grasp whether or not erasure has been performed on the basis of a difference between an intermediate generation count and an accumulated generation count. In the above-described embodiment, warning information in a post-erasure hour meter part and warning information in a post-erasure time part are updated with being overwritten, and therefore the warning storage means 56 is configured to be able to store pieces of information on a last generated warning among warnings that have been generated after pieces of warning information were erased. For this purpose, warning information in the post-erasure hour mater part and warning information in the post-erasure time part can be recognized as latest ones among the pieces of warning information generated after the erasure. In place of this, the warning storage means 56 may be configured to store pieces of information on a first generated warning among the warnings that have been generated after the pieces of warning information were erased.

The above-described embodiment is adapted to be able to logically erase warning information in a post-erasure hour meter and warning information in a post-erasure time part; however, the present invention may be adapted to be unable to erase (adapted to make unerasable) such pieces of warning information. That is, an intermediate accumulated time stored in the post-erasure hour meter part and an intermediate generation time stored in the post-erasure time part are retained so as not to be logically erased even in the case of pressing the erasure performing switch in the history erasing mode.

For example, even in the case where, as illustrated in FIG. 9(a), under a situation where "100 h" as an initial accumulated time, "2/3/2009" as an initial generation time, "140 h" as an intermediate accumulated time, "6/7/2009" as an intermediate generation time, "140 h" as a latest accumulated time, "6/7/2009" as a latest generation time, "1" as an intermediate generation count, and "13" as an accumulated generation count are stored in the warning storage means 56, the warning erasing means 57 is operated, the present invention may be adapted to retain, as illustrated in FIG. 9(b), at least "140 h" as the intermediate accumulated time and "6/7/2009" as the intermediate generation time in the warning storage means 56. By doing this, the display device 15 can be used to surely check the intermediate accumulated time and intermediate generation time that are pieces of warning information after erasure, and therefore the pieces of warning information after the erasure are easily grasped.

Also, the post-erasure storage parts (post-erasure hour meter part and post-erasure time part) for storing pieces of warning information generated after erasure in a storage table are provided so as to be able to distinguish the pieces of warning information generated after the erasure from the other pieces of warning information; however, the present invention may be adapted to not only display the pieces of warning information stored in the post-erasure hour meter part and post-erasure time part on the display device 15, but be able to connect a personal computer or the like to the main control device 30 or the display device 15 to extract the pieces of warning information outside. A method for extracting the pieces of warning information stored in the post-erasure storage parts may be, without limitation to the extraction through the personal computer, a method that connects an external flash memory to perform the extraction, or another method.

FIGS. 11 to 20 illustrate another operation machine of the present invention. Note that in the operation machine, an overall configuration of the operation machine, which includes a traveling unit 2, an upper revolving body 3, and the like, is the same as that illustrated in FIG. 10, and therefore description thereof is omitted. Further, a display device 15 is also the same as that illustrated in FIG. 2, and therefore description thereof is omitted. Regarding a main control device 30, description of the same parts as those in the above-described embodiment is omitted, and different points are described.

Figure 11:
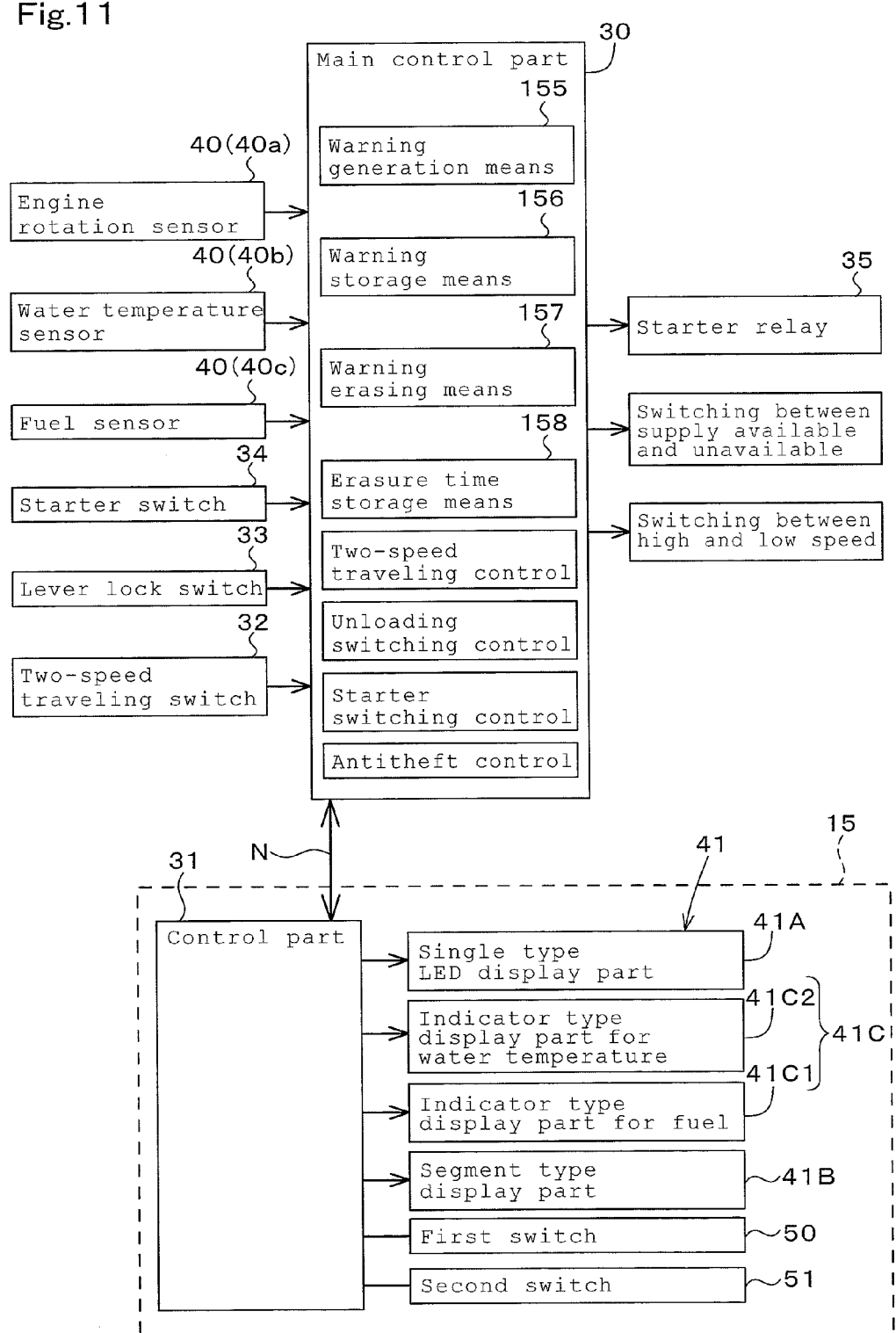
FIG. 11 is a block diagram of a control system in another operation machine.

As illustrated in FIG. 11, the main control device 30 is provided with warning generation means 155, warning storage means 156, warning erasing means 157, and erasure time storage means 158. The warning generation means 155 and the warning erasing means 157 are configured to include programs and the likes stored in the main control device 30, respectively.

As with the above-described warning generation means 55, on the basis of pieces of detected information detected by the detectors 40, and the like, the warning generation means 155 determines whether or not the operation machine 1 is abnormal, and also in the case where the warning generation means 55 determines that the operation machine 1 is abnormal, the warning generation means 55 generates a warning. For example, in the case where a detected engine rotation number is equal to or more than a predetermined rotation number (e.g., 700 rpm), a detected water temperature is equal to or more than a predetermined temperature (e.g., 1200° C. or more), and the detected engine rotation number and the detected water temperature continue for a predetermined time or more (e.g., 1 second or more), the warning generation means 155 determines that the operation machine 1 is abnormal (overheat), and generates a warning indicating the overheat. Also, in the case where abnormality such as CAN communication abnormality, fuel sensor disconnection abnormality, or water temperature sensor disconnection abnormality occurs, the warning generation means 155 generates a warning.

Further, in the case of generating a warning, the warning generation means 155 outputs a warning code N (warning type) so as to be able to distinguish each warning (abnormality), as with the above-described warning generation means 55.

As with the above-described warning storage means 56, the warning storage means 156 is also configured to include, for example, a nonvolatile memory (e.g., a flash memory) and the like, and stores information on a warning (warning information). The warning storage means 156 is adapted to store at least a warning code N (warning type) of a warning, and a time when the warning is generated with relating the warning code N and the time to each other.

As illustrated in FIG. 12, the warning storage means 156 has a storage table (referred to as a first storage table) for storing content of warning information distinctively for each of the warning codes N. That is, the first storage table is assigned to each of the warnings. Further, each of the first storage tables is divided into an initial hour meter part, an initial time part, a final hour meter part, and a final time part.

The initial hour meter part is, as described above, a part that, in the case where a warning corresponding to a warning code N is generated first after shipment of the operation machine 1 from a manufacturer manufacturing the operation machine 1, stores an accumulated time (hour meter) at the time of the warning generation as warning information. The initial time part is a part that, in the case where the warning corresponding to the warning code N is generated first after the shipment of the operation machine 1 from the manufacturer, stores a time of the warning generation (generation time) as warning information.

For example, it is assumed that the overheat occurs first after the shipment of the operation machine 1; the accumulated time (hour meter) at the time of the warning generation is 100 hours (100 h); and the generation time is Mar. 2, 2009.

In this case, the warning storage means 156 stores "100 hours", which is the accumulated time at the time of the first generation of the overheat warning, in the initial hour meter part corresponding to the overheat, and also stores "Mar. 2, 2009", which is the occurrence time of the overheat, in the initial time part corresponding to the overheat. For convenience of description, warning information stored in a corresponding initial hour meter part, and warning information stored in a corresponding initial time part may be respectively referred to as an initial accumulated time and an initial generation time.

The final hour meter part is, as described above, a part that, in the case where a latest warning is generated, stores an accumulated time (hour meter) at the time of the warning generation as warning information. The final time part is a part that, in the case where the latest warning is generated, stores a time of the generation as warning information.

For example, it is assumed that, as illustrated in FIG. 13(a), in the case where in the final hour meter part, "100 hours" as an accumulated time is already stored, and in the final time part, "Mar. 2, 2009" as a time is already stored, subsequently in Jul. 6, 2009, the warning corresponding to the same warning code N is generated, and an accumulated time at the warning generation is 140 hours.

In this case, the warning storage means 156 writes "140 hours" as the accumulated time over the final hour meter part to store "140 hours", and also writes "Jul. 6, 2009" as the generation time over the final time part to store "Jul. 6, 2009". On the basis of this, the pieces of warning information stored in the warning storage means 156 come into a state in FIG. 13(b) from the state in FIG. 13(a).

In addition, for convenience of description, warning information stored in a corresponding final time part, and warning information stored in a corresponding final time part may be respectively referred to as a latest accumulated time and a latest generation time.

As described above, the warning storage means 156 is adapted to store the four types of warning information (initial accumulated time, initial generation time, latest accumulated time, and latest generation time) in a first storage table set for each of the warning types.

Meanwhile, various pieces of warning information stored by the warning storage means 156 can be displayed by putting the display device 15 not into the above-described normal display mode but into the special display mode. That is, the display device 15 can be operated as display means adapted to display pieces of warning information stored in the warning storage means 156. An operation of the special display mode is the same as that illustrated in FIG. 7, and therefore description thereof is omitted.

In the special display mode, on the warning code display screen, which first storage table, which is set for one of the warning types, can be set to read pieces of warning information therein from the warning storage means 156. By pressing the second switch 51 in a state where the warning code display screen is displayed, from a first storage table corresponding to a warning code N, an initial accumulated time (warning information stored in the initial hour meter part) is read onto the display device 15, and in the segment type display part 41B, the initial accumulated time can be displayed.

Then, by pressing the second switch 51, from the first storage table corresponding to the warning code N, an initial generation time (warning information stored in the initial time part) can be read, and in the segment type display part 41B, part (year) of the initial generation time can be displayed. Subsequently, by pressing the second switch 51, part (month and day) of the initial generation time is displayed. As described, every time the second switch 51 is pressed, the pieces of warning information can be sequentially read from the first storage table, and displayed in the segment type display part 41B. Also, even after the initial generation time has been read from the first storage table, every time the second switch 51 is pressed, a latest accumulated time and a latest generation time can be read, and displayed in the segment type display part 41B.

Note that this embodiment is adapted to, every time the second switch 51 is pressed, read the respective pieces of warning information from the first storage table; however, the present invention may be adapted to, when the warning code N is displayed on the warning code display screen, collectively read and temporarily store the pieces of warning information in the first storage table corresponding to the warning code N, and then every time the second switch 51 is pressed, sequentially display the pieces of warning information in the segment type display part 41B.

As described above, this embodiment is adapted such that, for each of the warning codes N, many pieces of warning information are stored in the warning storage means 156, and pieces of warning information can be erased by the warning erasing means 157.

The warning erasing means 157 is means adapted to logically erase pieces of warning information stored in the warning storage means 156, and as will be described later, the pieces of logically erased warning information are processed as not being present in the warning storage means 156.

To activate the warning erasing means 157, by pressing the second switch 51 long for several seconds, the display device 15 is put into the "history erasing mode" in the "special display mode". After the display device 15 has been put into the display erasing mode, by pressing the second switch 51 long for several seconds, the warning erasing means 157 is activated. At this time, the second switch 51 serves as the erasure performing switch for performing erasure.

When the second switch 51 is pressed to activate the warning erasing means 157, all pieces of warning information (initial accumulated times, initial generation times, latest accumulated times, and latest generation times) stored in the warning storage means 156 are logically erased.

Figure 14:
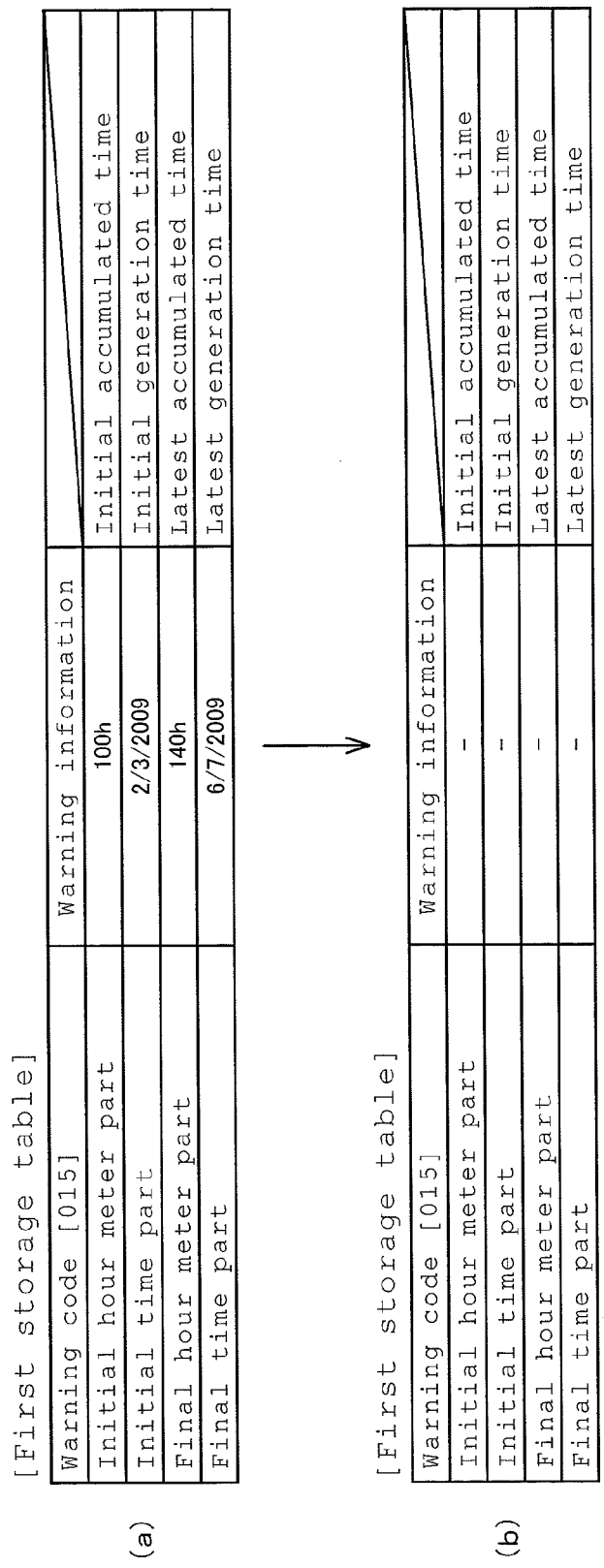
FIG. 14 is a diagram illustrating an example where pieces of warning information in the first storage table are erased by warning erasing means.

For example, it is assumed that, as illustrated in FIG. 14(a), "100 h" as an initial accumulated time, "2/3/2009" as an initial generation time, "140 h" as a latest accumulated time, and "6/7/2009" as a latest generation time are stored in the warning storage means 156. In this case, when the warning erasing means 157 is operated, as illustrated in FIG. 14 (b), in the warning storage means 156, all of the pieces of warning information are erased (logically erased), and cannot be displayed even by the display device 15.

That is, in the case where pieces of warning information are erased by the warning erasing means 157, the pieces of erased warning information are handled as being absent in the warning storage means 156, and cannot be read from the warning storage means 156.

As described above, in the operation machine 1, pieces of warning information can be freely logically erased by the warning erasing means 157, and by performing the logical erasure, a free space in the warning storage means 156 (flash memory) can be increased, which is convenient for increasing the free space. On the other hand, it is very difficult in a normal manner to extract pieces of warning information having been once logically erased.

In the case where, in order to conceal a warning, pieces of information on the warning are intentionally erased, the warning is regarded as not being generated from the first, and therefore it is very difficult to accurately grasp the presence or absence of warning generation.

Therefore, even though the operation machine of the present invention is configured to be able to erase pieces of warning information by the warning erasing means 157, the operation machine is configured to be able to leave an erasure time, which is a time of the erasure of the pieces of warning information by the warning erasing means 157, by the erasure time storage means 158.

The erasure time storage means 158 is configured to include, for example, a nonvolatile memory (e.g., a flash memory) and the like, and stores an erasure time when pieces of warning information are erased. In addition, the erasure time storage means 158 may be configured to include the same nonvolatile memory as that in the warning storage means 156, or a different nonvolatile memory from that in the warning storage means 156.

As illustrated in FIG. 15, the erasure time storage means 158 has a storage table (referred to as a second storage table) that stores a time (erasure time) when pieces of warning information are erased.

In the case where, as illustrated in FIG. 15(a), for example, on "Jan. 6, 2009", a user or the like operates the second switch 51 or the like to put the display device 15 into the history erasing mode, and then presses the erasure performing switch 51 to logically erase all pieces of warning information stored in the warning storage means 156 by the warning erasing means 157, in the second storage table of the erasure time storage means 158, "6/1/2009" as a time when the erasure performing switch 51 is pressed is stored.

Subsequently to this, in the case where the user or the like presses the erasure performing switch 51 on "Jul. 10, 2009" to again logically erase all pieces of warning information stored in the warning storage means 156, in the second storage table of the erasure time storage means 158, "10/7/2009" as a time when the erasure performing switch 51 is pressed is added in addition to already stored "6/1/2009". That is, the erasure time storage means 158 is adapted to, every time pieces of warning information are erased, add and store a time of the erasure.

In addition, the second storage table illustrated in FIG. 15(*a*) is adapted to store, as the erasure time, "year" when the erasure is performed, "month" when the erasure is performed, and "day" when the erasure is performed; however, in place of this, the present invention may be adapted to store, as illustrated in FIG. 15(*b*), as the erasure time, an accumulated time (hour meter) at the time when the erasure is performed.

For example, in the case where, when the accumulated time is "2500 hours (2500 h)", the user or the like operates the second switch 51 or the like to put the display device 15 into the history erasing mode, and then presses the erasure performing switch 51 to logically erase all pieces of warning information stored in the warning storage means 156 by the warning erasing means 157, in the second storage table of the erasure time storage means 158, "2500 hours" as the accumulated time at the time when the erasure performing switch 51 is pressed is stored.

Subsequently to this, in the case where, when the accumulated time is "3000 hours (3000 h)", the user or the like presses the erasing performing switch 51 to again logically erase all pieces of warning information stored in the warning storage means 156, in the second storage table of the erasure time storage means 158, "3000 hours" as the accumulated time at the time when the erasure performing switch 51 is pressed is added in addition to already stored "2500 hours".

Regarding erasure times (e.g., dates or accumulated times) stored in the erasure time storage means 158 as described above, it is better to adapt the present invention such that the erasure times can be displayed on the display device 15 or extracted outside with use of a personal computer or the like. For example, the present invention may be adapted to display the erasure times in the segment type display part 41B by operating the first switch 50 or second switch 51 connected to the display device 15, or to be able to connect a personal computer, a flash memory, or the like to the main control device 30 or the display device 15 to read the erasure times into the personal computer or the flash memory.

Also, it is better to configure the present invention such that means adapted to logically erase erasure times (pieces of information in the second storage table) stored in the erasure time storage means 158 is not provided in the operation machine, and a device mounted in the operation machine is operated to prevent the erasure times from being logically erased.

As describe above, the operation machine of the present invention is provided with the warning generation means 155, warning storage means 156, display means 15, warning erasing means 157, and erasure time storage means 158 adapted to store an erasure time when pieces of warning information are erased by the warning erasing means 157.

On the basis of this, even in the case where, in order to conceal a warning, pieces of information on the warning are intentionally erased, a time of the warning erasure is left, and therefore the fact that the warning has been generated in the past can be accurately grasped. In addition, not only the fact of the erasure can be simply grasped, but the erasure time can be identified, and therefore when the warning was generated can be identified.

In particular, the erasure time storage means 158 is adapted to store, as an erasure time, a time when erasure is performed by the erasure performing switch (second switch 51), and therefore a time when a user or the like pressed the erasure performing switch to intentionally erase pieces of warning information (a time when the erasure was performed) can be identified.

The warning storage means 156 may be varied as follows.

Each of the first storage tables of the warning storage means 156 is, in addition to the initial hour meter part, initial time part, final hour meter part, and final time part, divided into a post-erasure hour meter part, a post-erasure time part, a count part, and an accumulated count part.

The post-erasure hour meter part is a part that, in the case where after pieces of warning information have been erased from the warning storage means 156 by the warning erasing means 157 (after the erasure performing switch 51 has been pressed), a warning is newly generated, stores an accumulated time (hour meter) at the time of the new warning generation as warning information.

The post-erasure time part is a part that, in the case where after the pieces of warning information have been erased by the warning erasing means 157 (after the erasure performing switch 51 has been pressed), the warning is newly generated, stores a generation time of the warning as warning information.

For example, it is assumed that, as illustrated in FIG. 16, after pieces of warning information have been erased, the overheat newly occurs; an accumulated time at the time of the overheat occurrence is 140 hours (140 h); and an occurrence time is Jul. 6, 2009. In this case, the warning storage means 156 stores "140 hours" as the accumulated time in the post-erasure hour meter part corresponding to the overheat, and also stores "Jul. 6, 2009" as the time of the overheat occurrence in the post-erasure time part corresponding to the overheat. For convenience of description, warning information stored in a corresponding post-erasure hour meter part and warning information stored in a corresponding post-erasure time part may be respectively referred to as an intermediate accumulated time and an intermediate generation time.

The count part is a part that stores the number of times a warning is generated (generation count) as warning information. For example, every time the overheat warning is repetitively generated, a warning generation count is counted up, and every time the count up is performed, the warning storage means 156 stores the generation count in the count part by overwriting. In addition, the count part is adapted such that information therein is erased by the warning erasing means 157 as will be described later, and in the case where the warning erasing means 157 erases a generation count in the count part, the generation count becomes zero.

The accumulated count part is a part that, after the shipment of the operation machine 1 from the manufacturer, stores an accumulated warning generation count for the same warning, and the accumulated warning generation count cannot be erased by the warning erasing means 157 (a generation count in the accumulated count part cannot be made zero.) Every time a warning is generated, the warning storage means 156 stores a generation count in a corresponding accumulated count part by overwriting. In addition, for convenience of description, warning information stored in a corresponding count part, and warning information stored in a corresponding accumulated count part may be respectively referred to as an intermediate generation count and an accumulated generation count.

The warning storage means 156 in the variation is adapted to, in a first storage table set for each of the warning types, store the eight types of warning information (initial accumulated time, initial generation time, intermediate accumulated time, intermediate generation time, latest accumulated time, latest generation time, intermediate generation count, and accumulated generation count).

In particular, the warning storage means 156 is adapted to store pieces of warning information, i.e., an intermediate accumulated time and an intermediate generation time, that are newly generated after pieces of warning information have been erased, and therefor by seeing both of the pieces of warning information after the erasure and a time of the erasure, a warning having been generated in the past can be estimated.

That is, even in the case where pieces of warning information are erased as described above, a warning having been once generated tends to be easily generated again, and therefore in the case where a period between a warning generated again (warning after erasure) and a time of the erasure is short, it can be considered that the warning generated again was generated before the erasure.

For example, it is assumed that, as illustrated in FIG. 17(a), when pieces of warning information were erased on "Jul. 10, 2009", "10/7/2009" as the erasure time was stored in the erasure time storage means 158. Then, as illustrated in FIG. 17(b), in the case where, after the pieces of warning information have been erased, the overheat occurs on "Jul. 13, 2009", the post-erasure time part of the warning storage means 156 that stores pieces of warning information on the overheat, "13/7/2009" as the time of the overheat occurrence (intermediate generation time) is stored.

As illustrated in FIGS. 17(a) and (b), by seeing the erasure time stored in the erasure time storage means 158 and the intermediate generation time in the warning storage means 156, it turns out that the erasure time is "Jul. 10, 2009", and the occurrence time of the overheat having occurred after the erasure is "Jul. 13, 2009". A period between the erasure time when the pieces of warning information were erased, and the generation time when the warning is generated after the erasure is equal to or less than one week, and the both times are relatively close to each other, so that a warning having been generated in the past can be estimated to be the overheat warning.

In addition, the present invention may be adapted such that pieces of warning information (intermediate accumulated time, and intermediate generation time) generated after erasure cannot be erased by the warning erasing means 157.

For example, even in the case where the warning erasing means 157 is operated under a situation where, as illustrated in FIG. 18(a), "100 h" as an initial accumulated time, "2/3/2009" as an initial generation time, "140 h" as an intermediate accumulated time, "6/7/2009" as an intermediate generation time, "140 h" as a latest accumulated time, "6/7/2009" as a latest generation time, "1" as an intermediate generation count, and "13" as an accumulated generation count are stored in the warning storage means 156, the present invention may be adapted to retain at least "140 h" as the intermediate accumulated time and "6/7/2009" as the intermediate generation time in the warning storage means 156 as illustrated in FIG. 18(b).

By doing this, the intermediate accumulated time and the intermediate generation time that are pieces of warning information after the erasure can be surely checked through the display device 15.

As described above, the present invention is adapted to, in the warning storage means 156, store pieces of information on a warning that is generated after pieces of warning information have been erased; however, it is better to, in the warning storage means 156, among the pieces of warning information generated after erasure, store at least pieces of warning information on a warning first generated after the erasure, or at least pieces of warning information on a warning last generated after the erasure. That is, in the case where the same warning has been generated multiple times after erasure, pieces of warning information on the warning first generated after the erasure are stored in the warning storage means 156, or pieces of warning information on the warning last generated after the erasure are stored in the warning storage means 156. In addition, both of the pieces of warning information on the first generated warning and the pieces of warning information on the last generated warning may be stored in the warning storage means 156, or any one of them may be stored.

The above-described embodiment is adapted to erase all pieces of warning information by the warning erasing means 157, and in the erasure time storage means 158, store an erasure time when all of the pieces of warning information are erased; however, a variation described below is further adapted to be able to erase at least part of pieces of warning information by the warning erasing means 157, and, by the erasure time storage means 158, store an erasure time when each of the pieces of erased warning information is erased.

Figure 19:
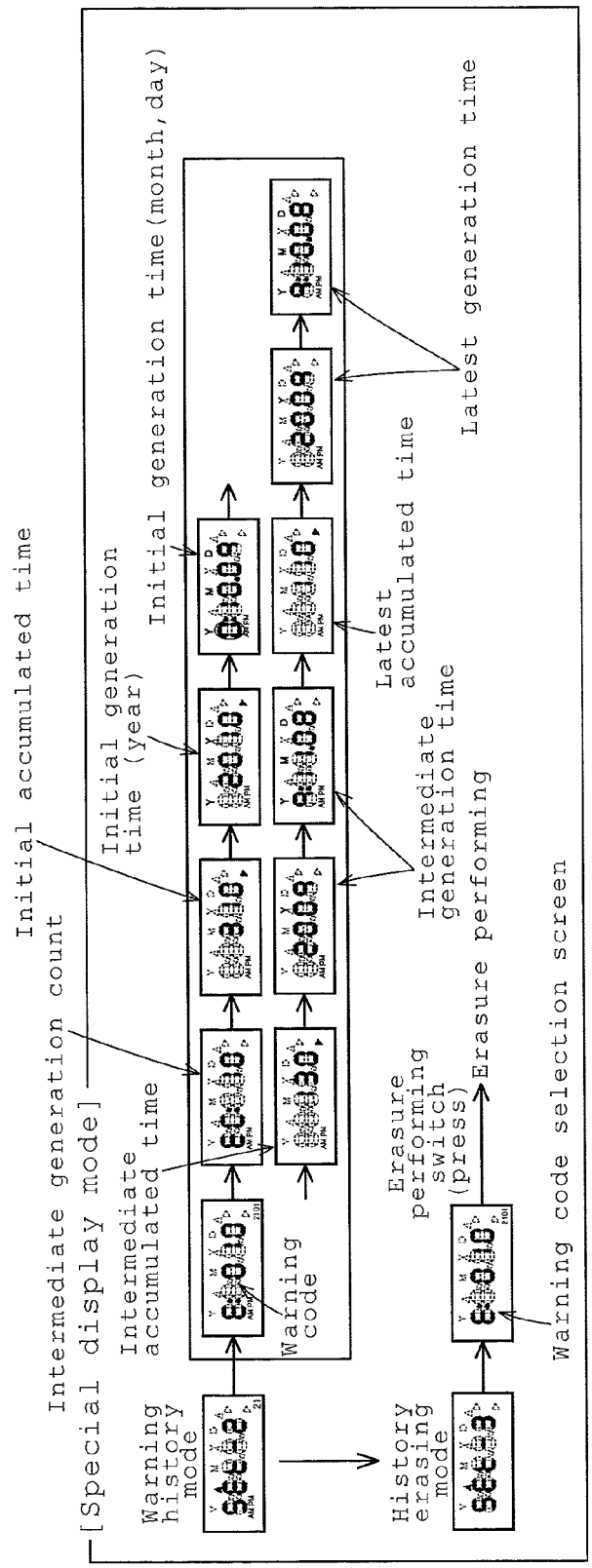
FIG. 19 is a diagram illustrating a procedure for erasing warning information by the warning erasing means.

The warning erasing means 157 in this case is one that, among a plurality of pieces of warning information, erases pieces of selected warning information as will be described later. To erase the pieces of selected warning information by the warning erasing means 157, first, as illustrated in FIG. 19, the display device 15 is put into the "history erasing mode" in the "special display mode". Then, by pressing the second switch 51 or the like, a warning code N corresponding to an erasing target is displayed in the segment type display part 41B (warning code selection screen).

By further pressing the second switch 51 or the like shortly on the warning code selection screen, the warning code N (warning code N corresponding to the erasing target) displayed in the segment type display part 41B is changed. That is, on the warning code selection screen, among the plurality of first storage tables provided in the warning storage means 156, which first storage table can be set to erase pieces of warning information therein.

Then, by pressing the second switch (erasure performing switch) long for several seconds in a state where the warning code selection screen is displayed, the warning erasing means 157 is activated. When the warning erasing means 157 is activated, the pieces of warning information in the first storage table corresponding to the warning code N set on the warning code selection screen are all logically erased. It should be appreciated that, in this embodiment, first storage tables corresponding to warning codes not selected on the warning code selection screen are not erased but remain in the warning storage means 156.

The erasure time storage means 158 is adapted to store an erasure time for each of the warning codes. That is, the erasure time storage means 158 is adapted to, for each of the warnings, store an erasure time when erasure is performed.

As illustrated in FIG. 20, the erasure time storage means 158 has the second storage table for storing an erasure time for each of the warning codes.

For example, assuming that pieces of warning information on the overheat corresponding to the warning code of 15 are erased on "Jul. 10, 2009" by the warning erasing means 157, the erasure time storage means 158 stores "Jul. 10, 2009" as the erasure time in the second storage table with relating the warning code corresponding to the pieces of erased warning information and the erasure time to each other.

That is, the erasure time storage means 158 stores an erasure time for each of the warning codes, and therefore by seeing an erasure time and a warning code, which warning was erased and when the warning was erased can be individually grasped.

In addition, the warning erasing means 157 may be configured not to erase all pieces of warning information or pieces of warning information selected from among a plurality of pieces of warning information, but to erase pieces of predetermined warning information.

FIGS. 21 to 24 illustrate still another operation machine of the present invention. Note that, also in this operation machine, an overall configuration of the operation machine, which includes a traveling unit 2, an upper revolving body 3, and the like, is the same as that illustrated in FIG. 10, and therefore description thereof is omitted. Further, a display device 15 is also the same as that illustrated in FIG. 2, and therefore description thereof is omitted. Regarding a main control device 30, description of the same parts as those in any of the above-described embodiments is omitted, and different points are described.

Figure 21:
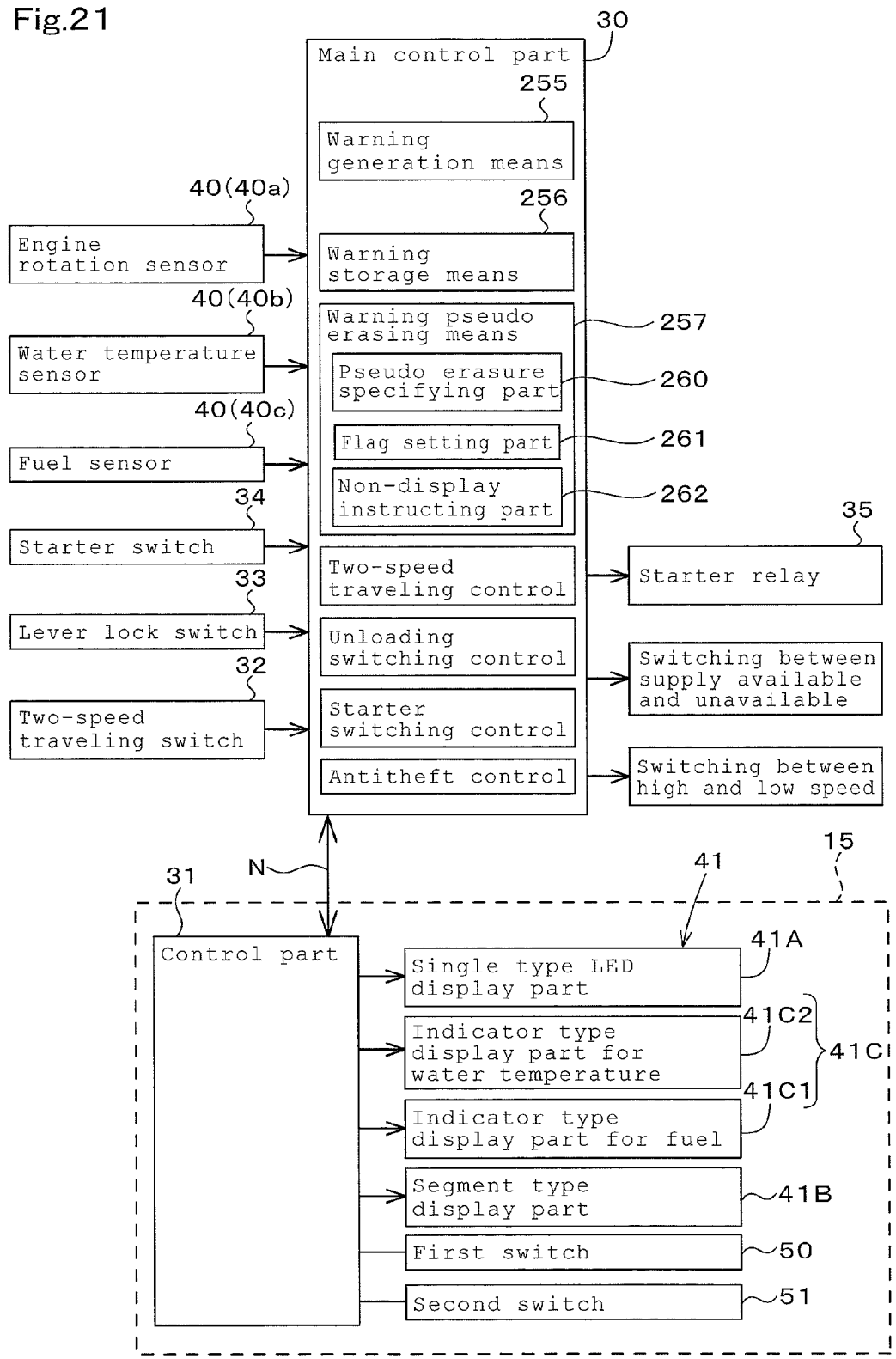
FIG. 21 is a block diagram of a control system in still another operation machine.

As illustrated in FIG. 21, the main control device 30 is provided with warning generation means 255 and warning storage means 256. The warning generation means 255 is configured to include a program and the like stored in the main control device 30. In the warning generation means 255, description of the same parts as those in any of the above-described warning generation means 55 and 155 is omitted. Also in the warning storage means 256, description of the same parts as those in any of the above-described warning storage means 56 and 156 is omitted.

A storage table in the warning storage means 256 is divided into an initial hour meter part, an initial time part, a post-erasure hour meter part, a post-erasure time part, a final hour meter part, a final time part, a count part, and an accumulated count part, and adapted to store eight types of warning information (initial accumulated time, initial generation time, intermediate accumulated time, intermediate generation time, latest accumulated time, latest generation time, intermediate generation count, and accumulated generation count).

In addition, the post-erasure hour meter part is a part that, in the case where, after pieces of warning information have been erased in a pseudo manner from the warning storage means 256 by warning pseudo erasing means 257 (after an after-mentioned erasing switch has been pressed) as will be described later, a warning is newly generated, stores an accumulated time (hour meter) at the time of the new warning generation as warning information.

Also, the post-erasure time part is a part that, in the case where after the pieces of warning information have been erased in the pseudo manner by the warning pseudo erasing means 257 (after the after-mentioned erasing switch has been pressed), the warning is newly generated, stores a time of the warning generation as warning information.

For example, it is assumed that after pieces of warning information have been erased in the pseudo manner, the overheat newly occurs; an accumulation time at the time of the overheat occurrence is 140 hours (140 h); and a time of the overheat occurrence is Jul. 6, 2009. In this case, the warning storage means 256 stores "140 hours" as the accumulated time in the post-erasure hour meter part corresponding to the overheat, and also stores "Jul. 6, 2009" as the overheat occurrence time in the post-erasure time part corresponding to the overheat.

In addition, once pseudo erasure is performed, the warning storage means 256 writes an accumulated time to be stored over a post-erasure hour meter part to update the accumulated time, and also writes a time to be stored over a post-erasure time part. For convenience of description, warning information stored in a corresponding post-erasure hour meter part and warning information stored in a corresponding post-erasure time part may be respectively referred to as an intermediate accumulated time and an intermediate generation time.

The warning storage means 256 is adapted to store many pieces of warning information, and the operation machine 1 (main control device 30) illustrated in FIGS. 21 to 24 is provided with the warning pseudo erasing means 257 adapted to erase in the pseudo manner pieces of warning information stored in the warning storage means 256.

The warning pseudo erasing means 257 is configured to include a program and the like stored in the main control device 30.

In the following, the warning pseudo erasing means 257 is described in detail.

The warning pseudo erasing means 257 is one that does not logically erase pieces of warning information stored in the warning storage means 256 to eliminate the pieces of warning information in the warning storage means 256, but just poses as if erasing the pieces of warning information, and in practice, performs processing so as to be able to easily extract pieces of warning information in the warning storage means 256 without erasing the pieces of warning information. Specifically, the warning pseudo erasing means 257 performs the processing of, by enabling pieces of warning information before pseudo erasure to be displayed on the display device 15, showing that the pieces of warning information stored in the warning storage means 256 are saved, and on the other hand, by disabling pieces of warning information after the pseudo erasure from being displayed on the display device 15, showing as if the pieces of warning information stored in the warning storage means 256 are erased.

In this embodiment, by performing the following process, the warning pseudo erasing means 257 can be operated (activated). In addition, an after-mentioned pseudo erasure specifying part 260, flag setting part 261, and non-display instructing part 262 are respectively configured to include control programs and the likes.

By pressing the second switch 51 long for several seconds, the display device 15 is put into the "special display mode", and then into the "history erasing mode". After the display device 15 has been put into the history erasing mode, by pressing the second switch 51 long for several seconds, the warning pseudo erasing means 257 is activated. At this time, the second switch 51 serves as the erasing switch for performing pseudo erasure. When the warning pseudo erasing means 257 is activated by pressing the erasing switch 51, a pseudo erasure time storage part 258 provided for the warning pseudo erasing means 257 unerasably stores, in the warning storage means 256, a time when the erasing switch 51 is pressed, i.e., a time (start time) when the pseudo erasure is performed.

When the warning pseudo erasing means 257 is activated by pressing the second switch 51, the pseudo erasure specifying part 260 provided for the warning pseudo erasing means 257 specifies pieces of warning information to be automatically erased in the pseudo manner. Specifically, when the erasing switch 51 is pressed, the pseudo erasure specifying part 260 automatically specifies that among pieces of warning information stored in the warning storage means 256, the intermediate accumulated times, intermediate generation times, latest accumulated times, latest generation times, and intermediate generation counts excluding the initial accumulated times, initial generation times, and accumulated generation counts are to be erased in the pseudo manner.

For example, it is assumed that, as illustrated in FIG. 22(a), "100 h" as an initial accumulated time, "2/3/2009" as an initial generation time, "140 h" as an intermediate accumulated time, "6/7/2009" as an intermediate generation time, "140 h" as a latest accumulated time, "6/7/2009" as a latest generation time, "1" as an intermediate generation count, and "13" as an accumulated generation count are stored in the warning storage means 256.

In this case, as illustrated in FIG. 22(b), the pseudo erasure specifying part 260 targets "140 h" as the intermediate accumulated time, "6/7/2009" as the intermediate generation time, "140 h" as the latest accumulated time, "6/7/2009" as the latest generation time, and "1" as the intermediate generation count for the pseudo erasure. Note that, in the history erasing mode, the pseudo erasure specifying part 260 does not set pieces of warning information to be erased in the pseudo manner for each of the warning types (does not specify pieces of warning information to be erased in the pseudo manner for each of the storage tables), but sets the pseudo erasure for the intermediate accumulated times, intermediate generation times, latest accumulated times, latest generation times, and intermediate generation times in all of the storage table.

Then, the flag setting part 261 provided for the warning pseudo erasing means 257 sets pseudo erasure flags F respectively indicating that the pseudo erasure is specified for the pieces of warning information for which the pseudo erasure is specified (intermediate accumulated time, intermediate generation time, latest accumulated time, latest generation time, and intermediate generation count). As illustrated in FIG. 22(b), the flag setting part 261 relates the pieces of warning information set by the pseudo erasure specifying part 260 and the pseudo erasure flags F to each other, and then stores the pieces of warning information respectively having the pseudo erasure flags F in the warning storage means 256 (storage table).

When the pseudo erasure flags F are added to the pieces of warning information in this manner, the warning pseudo erasing means 257 is activated at the time of displaying the pieces of warning information in the special display mode.

As described above, when the display device 15 is put into the "warning history mode" in the "special display mode", the warning pseudo erasing means 257 is activated. In the case where the pseudo erasing means 57 does not perform the pseudo erasure, by repetitively pressing the second switch 51, pieces of warning information are sequentially displayed; however, in the case where the pseudo erasure flags F are set by the flag setting part 261, the non-display instructing part 262 provided for the warning pseudo erasing means 257 instructs the display device 15 not to display the pieces of warning information respectively set with the pseudo erasure flags F, and the pieces of warning information are not displayed.

That is, at the time of displaying pieces of warning information on the display device 15, the non-display instructing part 262 prevents the display device 15 from reading the pieces of warning information respectively set with the pseudo erasure flags F among pieces of warning information stored in the warning storage means 256, and thereby prevents the display device 15 from displaying the pieces of warning information respectively set with the pseudo erasure flags F, or even in the case where the display device 15 reads the pieces of warning information respectively set with the pseudo erasure flags F, does not perform processing of displaying the pieces of warning information respectively set with the pseudo erasure flags F.

For example, in the above-described example, as illustrated in FIG. 23(a), before the pseudo erasure, the initial accumulation time, initial generation time, intermediate accumulated time, intermediate generation time, latest accumulated time, latest generation time, intermediate generation count, and accumulated generation count can be displayed on the display device 15; however, as illustrated in FIG. 23(b), after the pseudo erasure, the intermediate accumulated time, intermediate generation time, latest accumulated time, latest generation time, and intermediate generation count respectively set with the pseudo erasure flags F are prevented by the non-display instruction part 262 from being displayed, and when seeing the display device 15, the pieces of warning information are seen as if being erased.

As described above, the operation machine of the present invention is provided with the warning pseudo erasing means 257 adapted to erase pieces of warning information in the pseudo manner, and therefore, for example, in the case where a user or the like puts the display device 15 into the "history erasing mode" in the "special display mode" to erase pieces of warning information in the history erasing mode, the pieces of warning information erased in the history erasing mode are not displayed on the display device 15, which superficially makes it possible for the user or the like to feel that the user or the like has been able to erase the pieces of warning information in the warning storage means 256. However, in practice, the pieces of erased warning information are stored in the warning storage means 256 without being erased, and can be extracted.

For example, even in the case where in order to intentionally conceal the fact that the user used the operation machine 1 in a state where a warning was generated, the user uses the history erasing mode to erase pieces of warning information, in practice, the pieces of warning information are left, and therefore the present invention can prevent the user from using the operation machine 1 with a warning being generated.

In addition, the warning pseudo erasing means 257 does not logically or physically erase pieces of warning information, and therefore pieces of warning information stored in the warning storage means 256 can be easily extracted. The extraction (output) of pieces of warning information may be performed by any method, and the present invention may be adapted to be able to connect a personal computer or the like to the main control part 30 or the display device 15, and use the personal computer or the like, and the main control part 30 or the display device 15 to extract pieces of warning information in the warning storage means 256 outside, or connect an external flash memory to the main control part 30 or the display device 15 to extract the pieces of warning information.

The operation machine illustrated in FIGS. 21 to 24 is provided with the warning generation means 255, the warning storage means 256, and the warning pseudo erasing means 257, so that pieces of warning information having been erased by the warning pseudo erasing means 257 are stored in the warning storage means 256 without being erased, and can be extracted, and therefore the present invention can prevent a user from intentionally concealing a warning, and consequently suppress the user from using the operation machine under a situation where a warning is generated.

In the display device as disclosed in JP-A2001-95345, in the case where in order for a user to conceal the fact that the user uses the operation machine at a large load, the user uses the erase function provided for the display device to erase abnormality information (warning information), it is practically difficult to extract the warning information, and therefore the fact that the user has used the operation machine at the large load may not be able to be grasped; however, the operation machine illustrated in FIGS. 21 to 24 can prevent this.

Also, the warning pseudo erasing means 257 is provided with the pseudo erasure time storage part 58 that stores a time when the pseudo erasure is performed by the warning pseudo erasing means 257, and therefore a time when pieces of warning information were attempted to be erased can be identified.

Further, the warning pseudo erasing means 257 is provided with: the pseudo erasure specifying part 260 that specifies pieces of warning information to be erased in the pseudo manner; the flag setting part 261 that sets the pseudo erasure flags F respectively indicating that the pseudo erasure is specified for the pieces of warning information for which the pseudo erasure is specified by the pseudo erasure specifying part 260; and the non-display instructing part 262 that instructs the display device 15 not to display the pieces of warning information for which the pseudo erasure flags are set by the flag setting part 261. For this reason, the pseudo erasing process can be easily performed on the pieces of waning information stored in the warning storage means 256.

Meanwhile, the above-described embodiment is adapted such that, in the case of enabling the history erasing mode, among a plurality of pieces of warning information, pieces of predetermined warning information are automatically set by the pseudo erasure specifying part 260; however, the present invention may be adapted to be able to manually set pieces of warning information to be erased in the pseudo manner.

FIG. 24 illustrates a list of pieces of warning information displayed on the display device 15. As illustrated in FIG. 24, the list is adapted to, at the time of performing the pseudo erasure on the display device 15, display each of the pieces of warning information, and also be able to display a setting column A in which in a position corresponding to the warning information, whether or not the erasure is performed is set by the pseudo erasure specifying part 260.

The list is adapted such that a user operates the second switch 51 or the like to add a symbol "tick" in the setting column A displayed on the screen of the display device 15, and can thereby select pieces of warning information that the user desires to erase. Then, after the user has selected the pieces of warning information that the user desires to erase from the warning information list, and decided to erase the pieces of warning information with the erasing switch 51, the pieces of warning information for which the erasure is selected are added with the setting flags F by the flag setting part 261 and stored in the warning storage means 256.

As can be seen from this, the user feels that the pieces of selected warning information have been erased; however, in practice, even in the case of performing such an operation, the pieces of warning information remain, and therefore the user can be prevented from performing an erasing action in order to conceal the fact that a warning has been generated, or suppress the user from performing an action of using the operation machine 1 unjustly in a state where a warning is generated.

In the above-described embodiment, the warning generation means 255, the warning storage means 256, and the warning pseudo erasing means 257 are provided in the main control device 30; however, the warning generation means 255, the warning storage means 256, and the warning pseudo erasing means 257 may be provided anywhere in the operation machine 1. For example, the warning generation means 255, the warning storage means 256, and the warning pseudo erasing means 257 may be provided in the display device 15, or in any of control devices that control the operation machine 1.

In any of the above-described embodiments, the display device 15 is provided with the LED display parts 41A, segment type display part 41B, and indicator type display parts 41C; however, without limitation to this, the present invention may be provided with a liquid crystal display part that displays various pieces of information with use of a liquid crystal, or provided with one that displays information in another display format.

The above-described embodiment is adapted such that, after the pseudo erasure, as illustrated in FIG. 23(b), only the pieces of information having been erased in the pseudo manner are not displayed by the display device 15; however, in place of this, the present invention may be adapted to display "no history" on the display device 15 to inform as if a history has been erased.

Any of the embodiments disclosed herein should be considered as being exemplified in all respects but not being limited. The scope of the present invention is pointed out not in the above description but in the scope of claims, and intended to include any modification equivalent in meaning to and within the scope of claims.

In some of the above-described embodiments, the warning generation means 55 and 155, the warning storage means 56 and 156, the warning erasing means 57 and 157, and the erasure time storage means 58 and 158 are provided in the main control devices 30, respectively; however, the warning generation means 55 and 155, the warning storage means 56 and 156, the warning erasing means 57 and 157, and the erasure time storage means 58 and 158 may be provided in the display devices 15, or provided in any ones of control devices mounted in the operation machines 1, respectively.

In any of the above-described embodiments, the display device 15 is provided with the LED display parts 41A, segment type display part 41B, and indicator type display parts 41C; however, without limitation to this, the present invention may be provided with a liquid crystal display part that displays various pieces of information with use of a liquid crystal, or provided with one that displays information in another display format.

REFERENCE SIGNS LIST

15 Display device (display means)
30 Main control device
31 Control part 55, 155, 255 Warning generation means
56, 156, 256 Warning storage means

The invention claimed is:

1. An operation machine comprising:
   a warning generation means configured to determine whether there is abnormality or not and to generate a warning when there is abnormality;
   a warning storage means configured to store warning information on the warning;
   a display means configured to display the warning information stored in the warning storage means; and
   a warning pseudo erasing means configured to erase specified warning information of the warning information in a pseudo-erasing manner, the warning pseudo erasing means being configured to provide, after the warning information displayed by the display means is specified as the specified warning information, an instruction to make the specified warning information remain in the warning storage means and to make the display means not display the specified warning information.

2. The operation machine according to claim 1, wherein the warning pseudo erasing means includes:
   a pseudo erasure time storage part configured to store a time when the warning pseudo erasing means performs the erasing in the pseudo-erasing manner.

3. The operation machine according to claim 1, wherein the warning pseudo erasing means includes:
   a pseudo erasure specifying part configured to specify the warning information that is to be erased in the pseudo-erasing manner;
   a flag setting part configured to set, to the specified warning information, a pseudo erasure flag indicating the specifying of performing the erasing in the pseudo-erasing manner, the specified warning information being specified by the pseudo erasure specifying part to be erased in the pseudo-erasing manner; and
   a non-display instructing part configured to provide an instruction not to display, by the display means, the warning information being set with the pseudo erasure flag by the flag setting part.

4. An operation machine comprising:
   a warning generation means configured to determine whether there is abnormality or not and to generate a warning when there is abnormality;
   a warning storage means configured to store warning information on the warning;
   a display means configured to display the warning information stored in the warning storage means; and
   a warning pseudo erasing means configured to erase the warning information in a pseudo-erasing manner, wherein
   the warning pseudo erasing means includes:
     a pseudo erasure specifying part configured to specify the warning information that is to be erased in the pseudo-erasing manner;
     a flag setting part configured to set, to the warning information, a pseudo erasure flag indicating the specifying of performing the erasing in the pseudo-erasing manner, the warning information being specified by the pseudo erasure specifying part to be erased in the pseudo-erasing manner; and
     a non-display instructing part configured to provide an instruction not to display, by the display means, the warning information being set with the pseudo erasure flag by the flag setting part.

* * * * *